(12) United States Patent
Kanno et al.

(10) Patent No.: US 11,321,231 B2
(45) Date of Patent: May 3, 2022

(54) MEMORY SYSTEM AND METHOD OF CONTROLLING NONVOLATILE MEMORY WITH A WRITE BUFFER

(71) Applicant: Kioxia Corporation, Tokyo (JP)

(72) Inventors: Shinichi Kanno, Ota (JP); Naoki Esaka, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 31 days.

(21) Appl. No.: 17/016,666

(22) Filed: Sep. 10, 2020

(65) Prior Publication Data

US 2021/0149797 A1 May 20, 2021

(30) Foreign Application Priority Data

Nov. 19, 2019 (JP) .............................. JP2019-208739

(51) Int. Cl.
| | |
|---|---|
| *G06F 12/02* | (2006.01) |
| *G06F 12/08* | (2016.01) |
| *G06F 13/16* | (2006.01) |
| *G06F 12/0871* | (2016.01) |
| *G06F 13/40* | (2006.01) |
| *G06F 12/0868* | (2016.01) |

(52) U.S. Cl.
CPC ...... *G06F 12/0246* (2013.01); *G06F 12/0868* (2013.01); *G06F 12/0871* (2013.01); *G06F 13/1673* (2013.01); *G06F 13/4068* (2013.01)

(58) Field of Classification Search
CPC ............. G06F 13/1673; G06F 12/0246; G06F 12/0871
See application file for complete search history.

(56) References Cited

U.S. PATENT DOCUMENTS

| | | | |
|---|---|---|---|
| 6,278,718 B1 * | 8/2001 | Eschholz | H04J 3/0626 370/503 |
| 9,367,469 B2 | 6/2016 | Ogawa et al. | |
| 2017/0123721 A1 * | 5/2017 | Sela | G06F 3/0611 |
| 2017/0220267 A1 * | 8/2017 | Neelakanta | G06F 3/0616 |
| 2018/0314444 A1 * | 11/2018 | Jinzenji | G06F 3/0679 |
| 2019/0317691 A1 | 10/2019 | Kanno | |
| 2019/0332316 A1 * | 10/2019 | Kanno | G06F 12/1009 |
| 2019/0332327 A1 | 10/2019 | Ji | |

(Continued)

FOREIGN PATENT DOCUMENTS

| | | |
|---|---|---|
| JP | 6017065 B2 | 10/2016 |
| JP | 2019-185596 A | 10/2019 |

(Continued)

*Primary Examiner* — David E Martinez
(74) *Attorney, Agent, or Firm* — Oblon, McClelland, Maier & Neustadt, L.L.P.

(57) ABSTRACT

According to one embodiment, a controller of a memory system writes write data associated with a set of received write requests to a first write destination storage region in a first write mode of writing a plurality of bits per memory cell, without writing the write data to a second storage region. When receiving from a host a first request to cause a state of the first write destination storage region to transition to a second state in which writing is suspended, the controller transfers un-transferred remaining write data from a write buffer of the host to an internal buffer, and writes the remaining write data to the second storage region in a second write mode of writing 1 bit per memory cell.

15 Claims, 19 Drawing Sheets

(56) References Cited

U.S. PATENT DOCUMENTS

| | | | | |
|---|---|---|---|---|
| 2020/0241798 A1* | 7/2020 | Kanno | ................... | G06F 3/064 |
| 2021/0049114 A1* | 2/2021 | Kim | ....................... | G06F 13/28 |
| 2021/0149797 A1 | 5/2021 | Kanno et al. | | |

FOREIGN PATENT DOCUMENTS

| | | |
|---|---|---|
| JP | 2019-191909 A | 10/2019 |
| JP | 2021-81981 A | 5/2021 |

\* cited by examiner

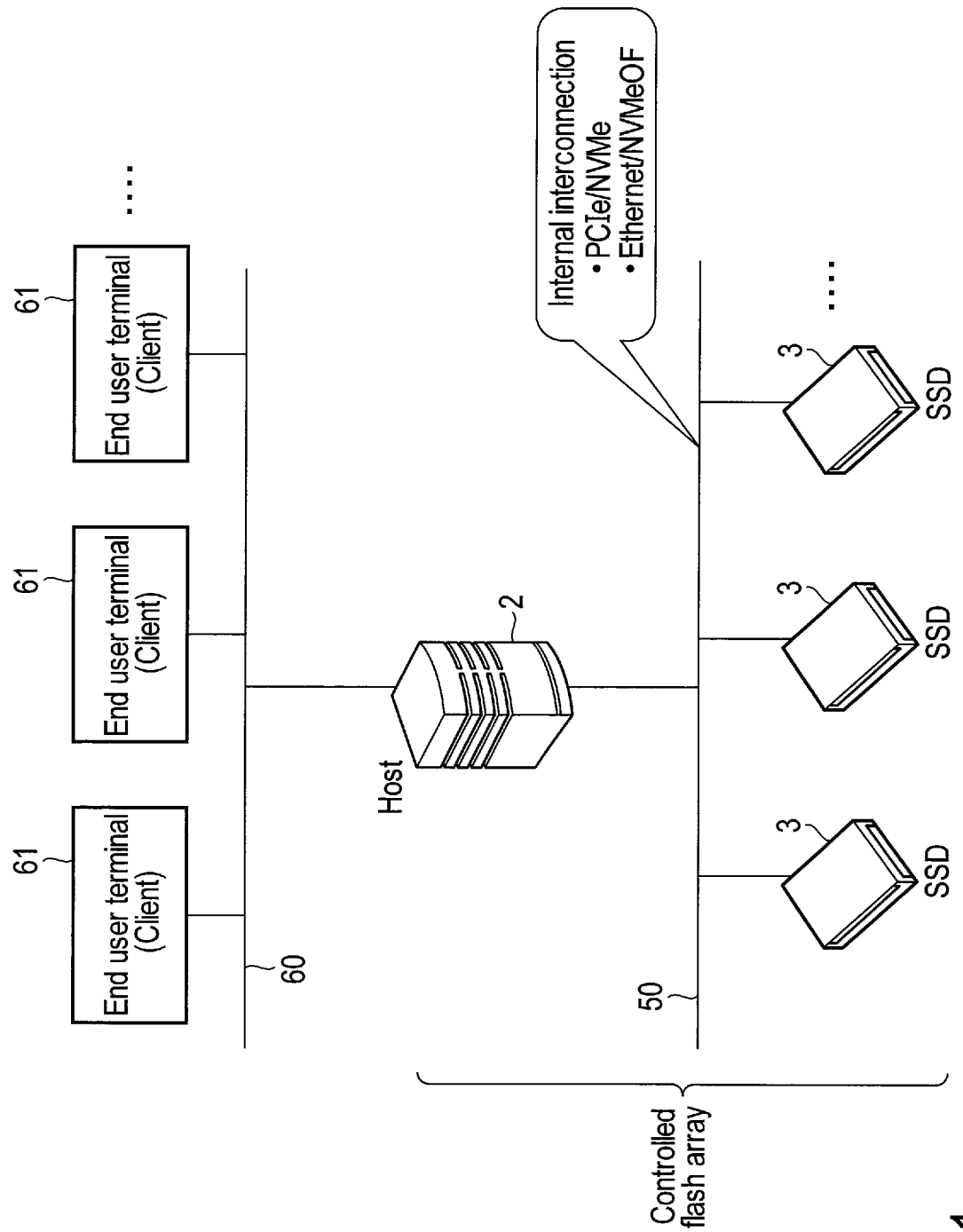
F I G. 1

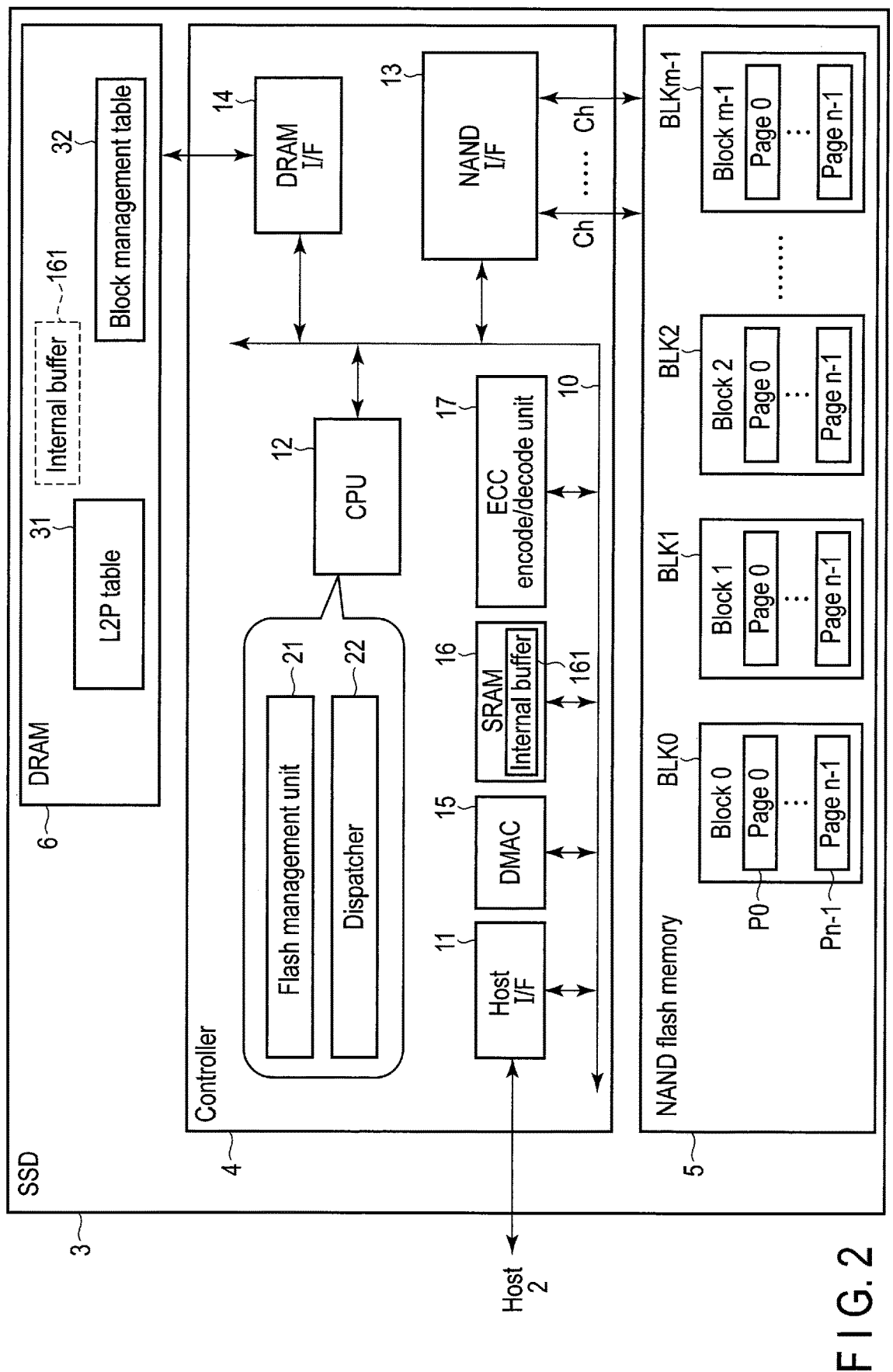
F I G. 2

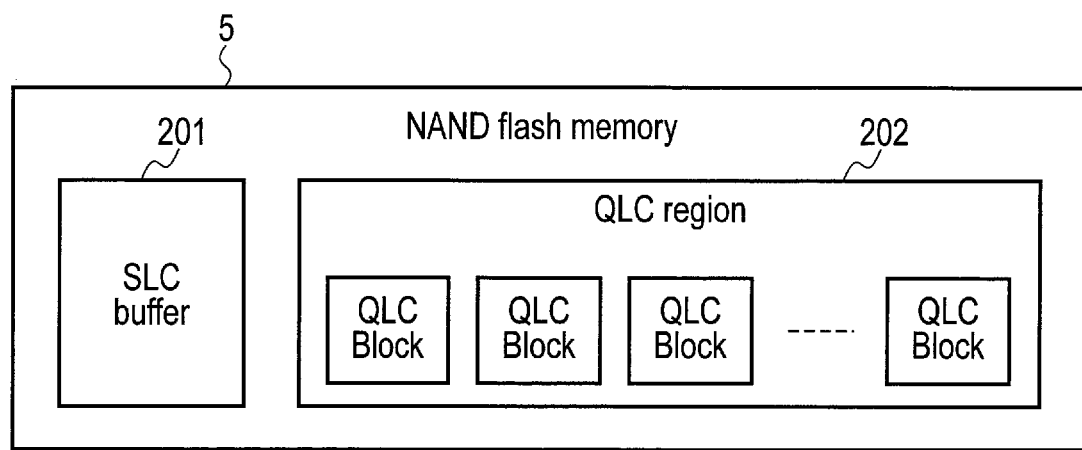
F I G. 3

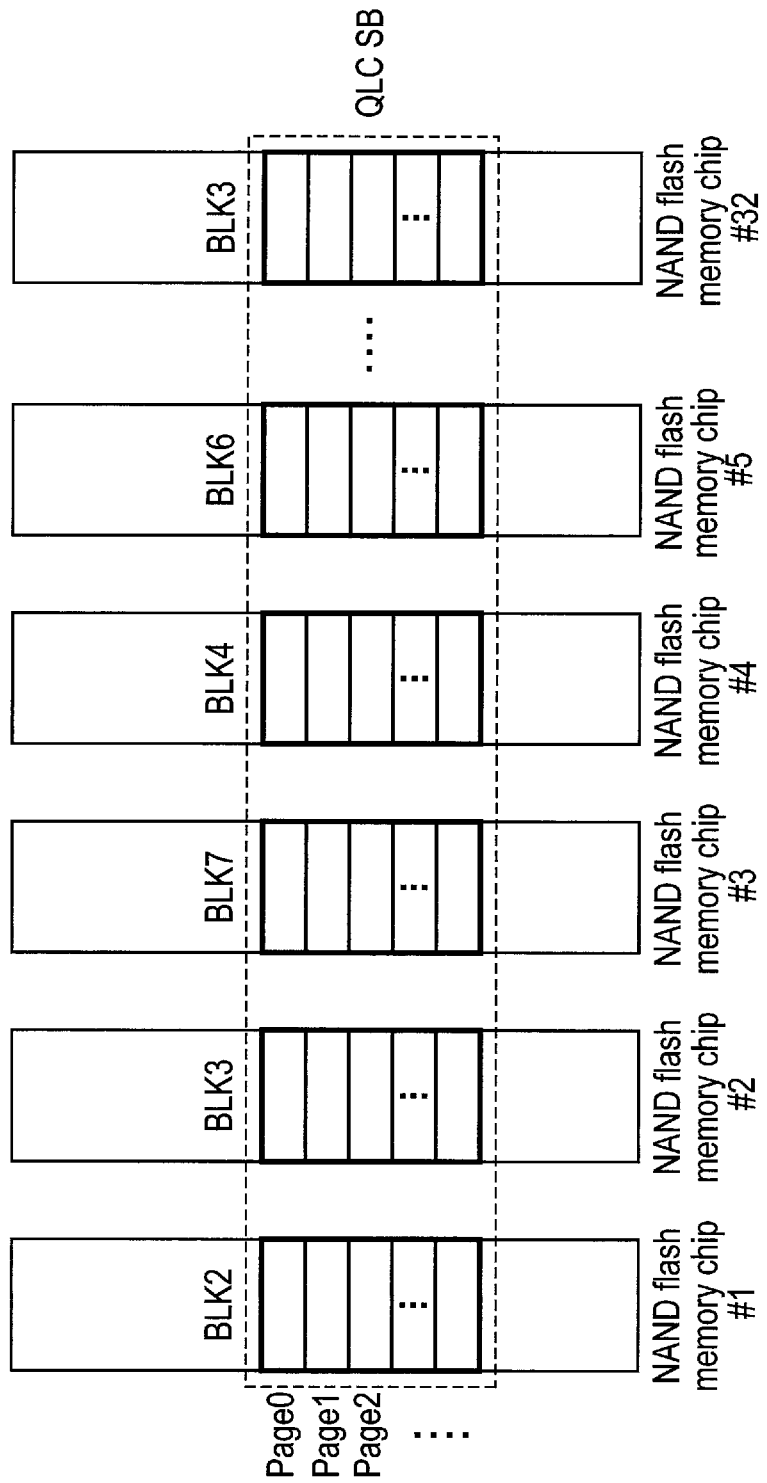
F I G. 5

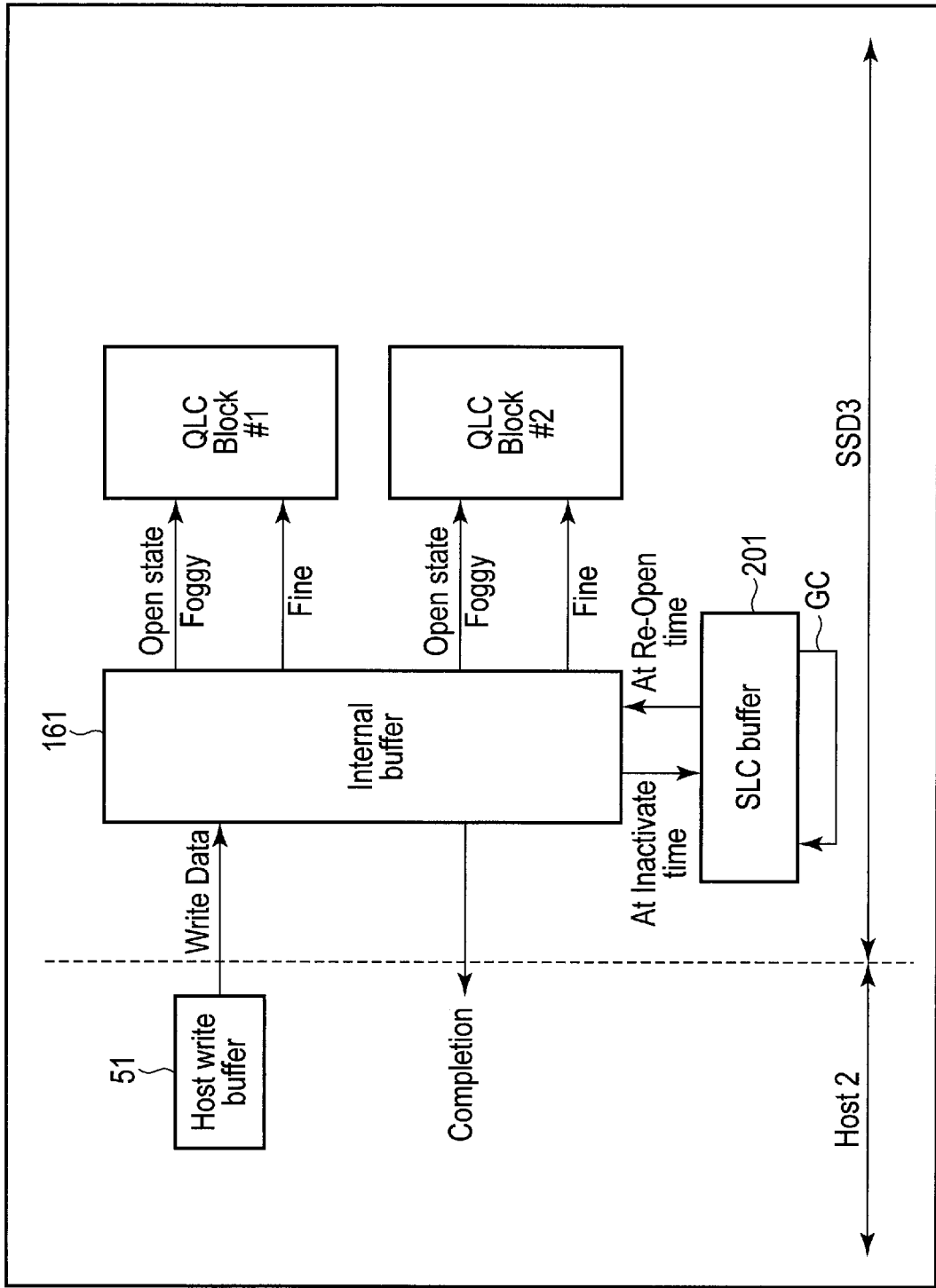
F I G. 8

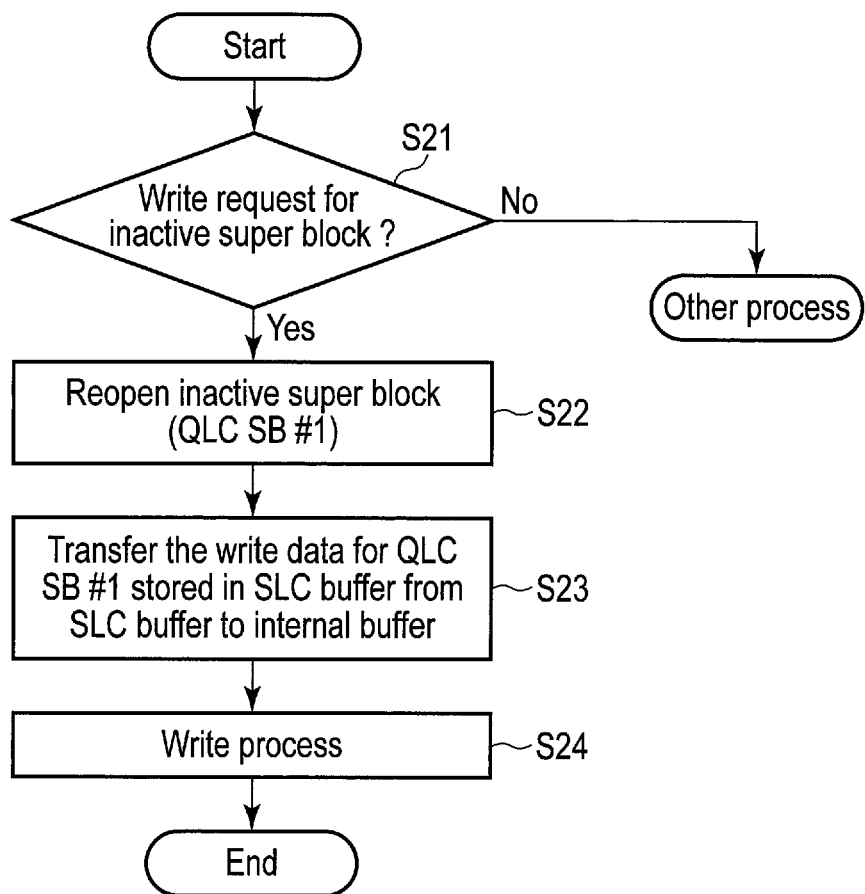
F I G. 12

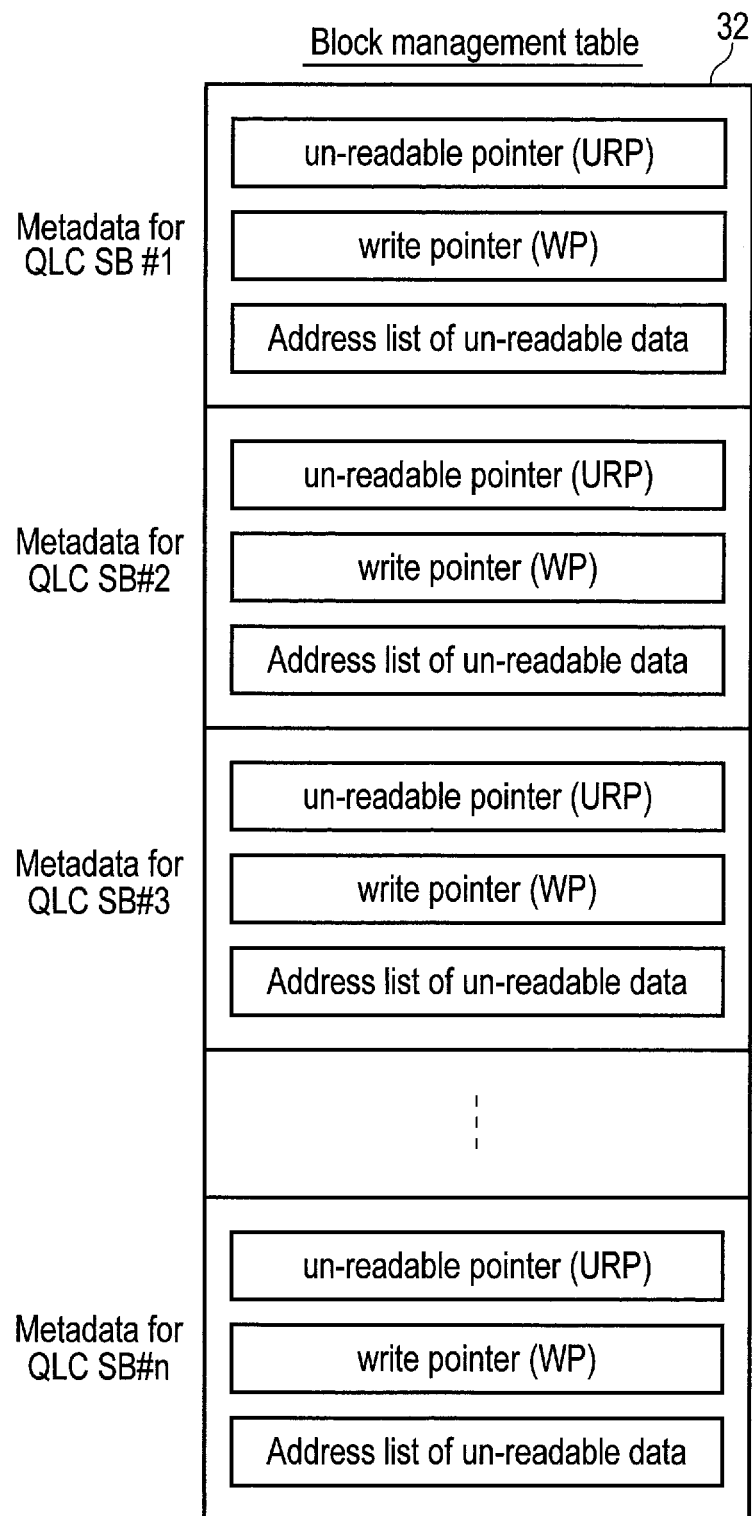
F I G. 14

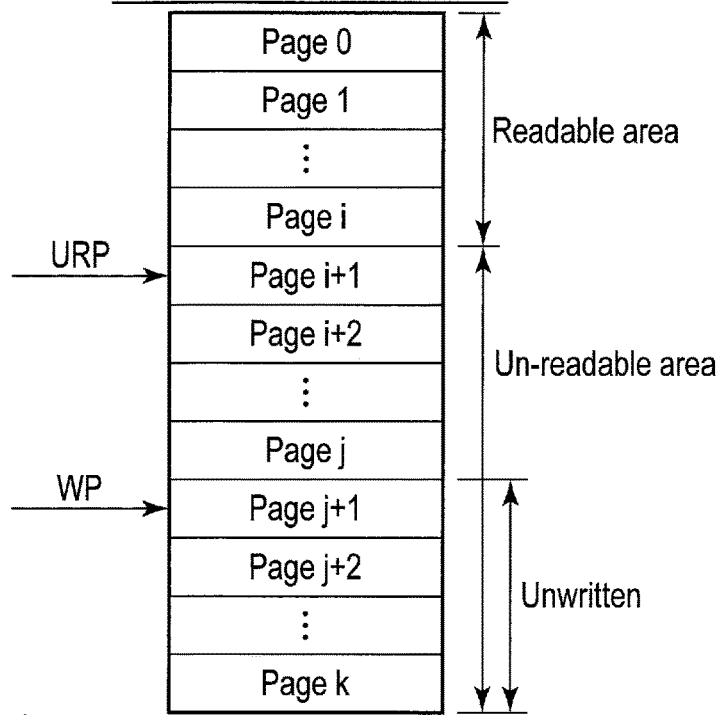
F I G. 15
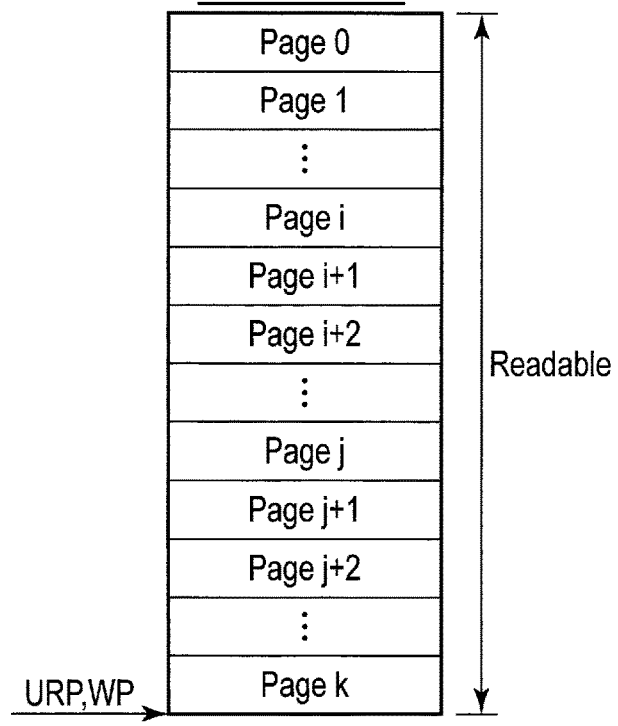
F I G. 16

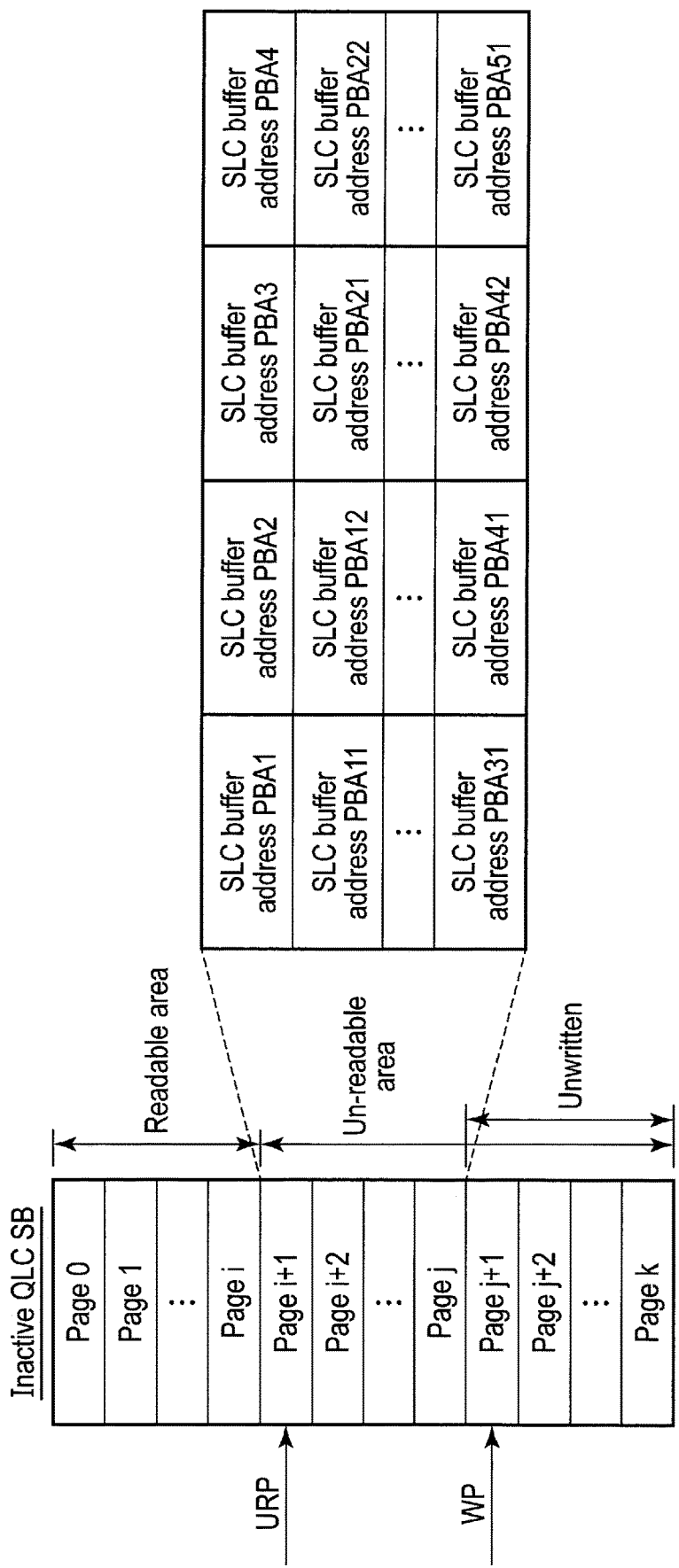
F I G. 18

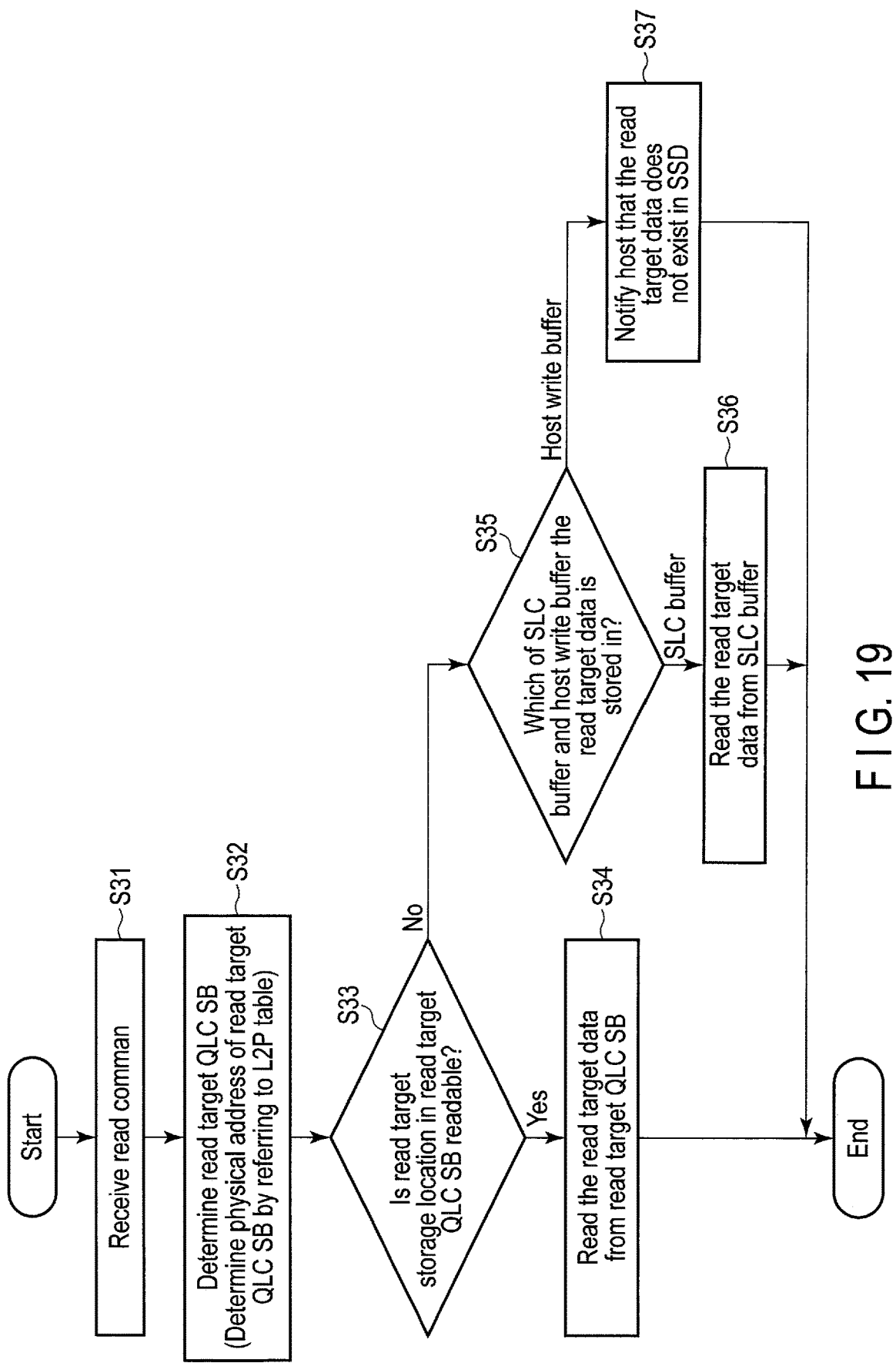
F I G. 19

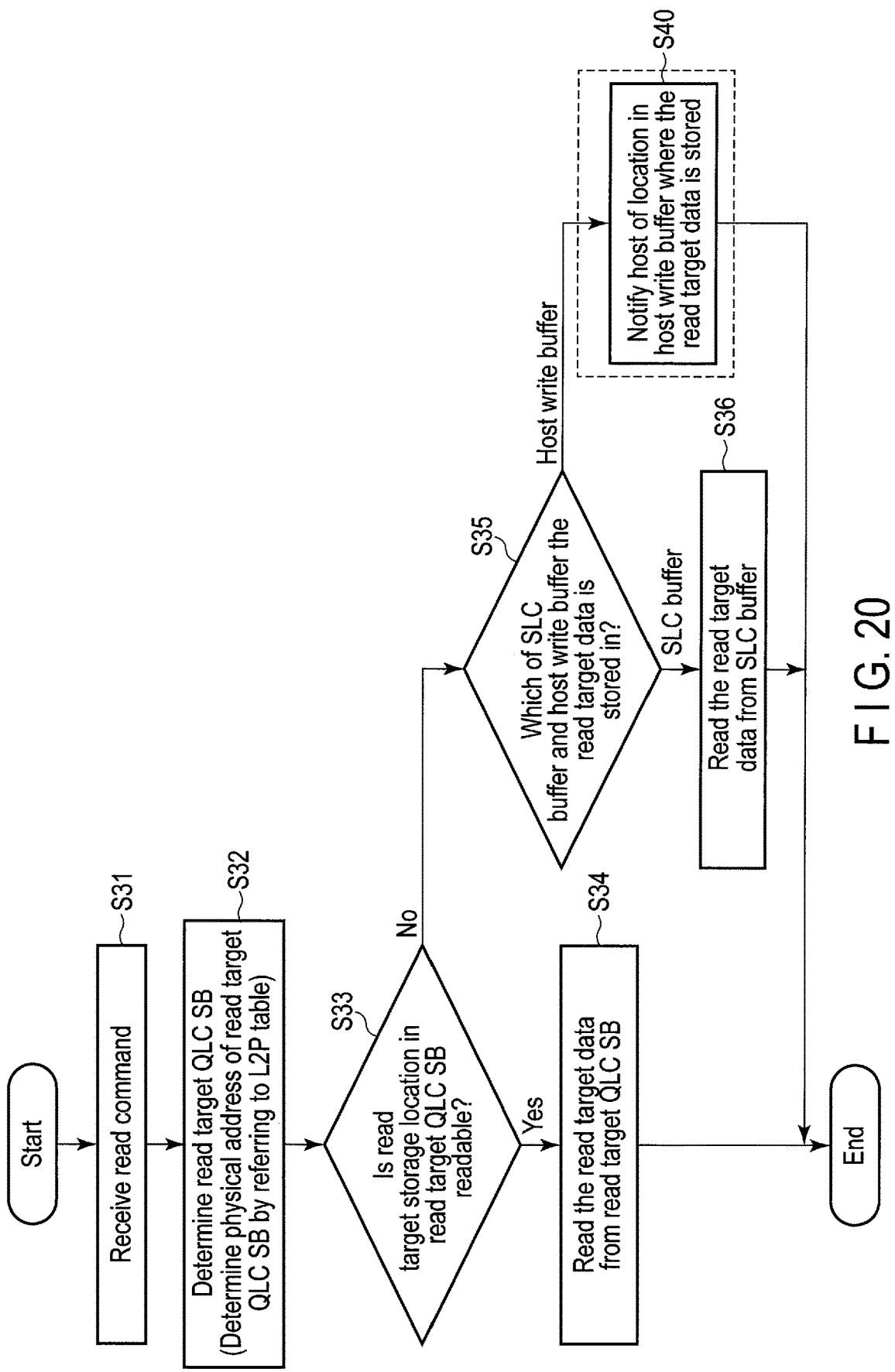
F I G. 20

MEMORY SYSTEM AND METHOD OF CONTROLLING NONVOLATILE MEMORY WITH A WRITE BUFFER

CROSS-REFERENCE TO RELATED APPLICATIONS

This application is based upon and claims the benefit of priority from Japanese Patent Application No. 2019-208739, filed Nov. 19, 2019, the entire contents of which are incorporated herein by reference.

FIELD

Embodiments described herein relate generally to a nonvolatile memory control technology.

BACKGROUND

In recent years, memory systems including nonvolatile memories have been widely prevalent. As such memory systems, a solid state drive (SSD) including a NAND flash memory has been known.

The memory systems such as the SSD are used as storage devices of various host computing systems such as a server in a data center.

In a nonvolatile memory, when the number of bits stored per memory cell increases, the storage capacity increases, but a time required to write data to the nonvolatile memory tends to be longer.

For this reason, implementing a new technique of efficiently using the storage region of the nonvolatile memory is required.

BRIEF DESCRIPTION OF THE DRAWINGS

FIG. 1 is a block diagram illustrating a relationship between a host and a memory system according to an embodiment.

FIG. 2 is a block diagram illustrating a configuration example of the memory system of the embodiment.

FIG. 3 is a block diagram illustrating a plurality of quad-level cell blocks (QLC blocks) and a single-level cell buffer (SLC buffer), which are used in the memory system according to the embodiment.

FIG. 5 is a diagram illustrating a configuration example of a block group used in the memory system according to the embodiment.

FIG. 8 is a diagram illustrating an operation of controlling the QLC blocks and the SLC buffer, which is executed in the memory system according to the embodiment.

FIG. 12 is a flowchart illustrating a procedure of an operation of reopening a QLC super block in the inactive state.

FIG. 14 is a diagram illustrating an example of a data structure of a block management table used in the memory system according to the embodiment.

FIG. 15 is a diagram illustrating an un-readable pointer (URP) and a write pointer (WP) corresponding to a QLC super block in the open state or inactive state.

FIG. 16 is a diagram illustrating an un-readable pointer (URP) and a write pointer (WP) corresponding to a QLC super block in the closed state.

FIG. 18 is a diagram illustrating an address list including addresses each indicative of a location where data to be written to an un-readable region of a QLC super block in the inactive state exists.

FIG. 19 is a flowchart illustrating a procedure of a read operation executed in the memory system according to the embodiment.

FIG. 20 is a flowchart illustrating another procedure of the read operation executed in the memory system according to the embodiment.

DETAILED DESCRIPTION

Figure 4:
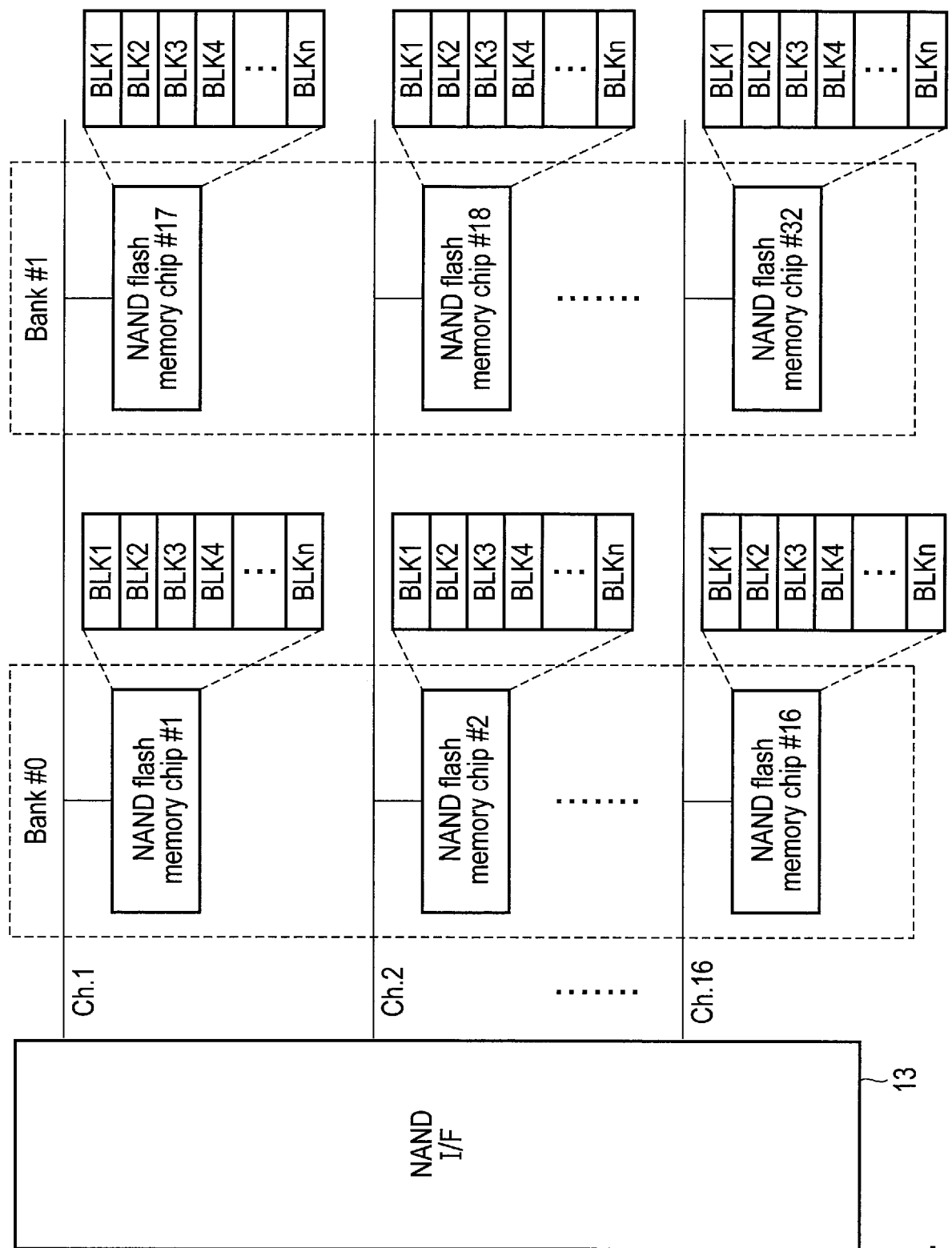
FIG. 4 is a block diagram illustrating a relationship between a plurality of channels and a plurality of NAND flash memory chips, which are used in the memory system according to the embodiment.

Various embodiments will be described hereinafter with reference to the accompanying drawings.

In general, according to one embodiment, a memory system connectable to a host comprises a nonvolatile memory, and a controller electrically connected to the nonvolatile memory and configured to write data to each of a plurality of first storage regions included in the nonvolatile memory in a first write mode of writing a plurality of bits per memory cell and write data to a second storage region included in the nonvolatile memory in a second write mode of writing 1 bit per memory cell.

In response to receiving from the host write requests to write data to a first write destination storage region allocated from the plurality of first storage regions, the controller transfers write data associated with a set of the received write requests from a write buffer of the host to an internal buffer in the memory system, and writes the write data transferred to the internal buffer to the first write destination storage region in the first write mode without writing the write data to the second storage region.

When receiving from the host a first request to cause a state of the first write destination storage region to transition from a first state of being allocated as a write destination storage region where writing of data is capable of being executed to a second state in which the writing is suspended, the controller transfers remaining write data associated with one or more write requests of the received write requests for the first write destination storage region, from the write buffer of the host to the internal buffer, the remaining write data being data un-transferred to the internal buffer, writes the remaining write data transferred to the internal buffer to the second storage region in the second write mode without writing the remaining write data to the first write destination storage region, and causes the state of the first write destination storage region to transition from the first state to the second state.

FIG. 1 is a block diagram illustrating a relationship between a host and a memory system according to the embodiment.

The memory system is a semiconductor storage device configured to write data to a nonvolatile memory and to read data from the nonvolatile memory. The memory system is implemented as a solid-state drive (SSD) 3 based on a NAND flash technology.

A host (host device) 2 is configured to control a plurality of SSDs 3. The host 2 is implemented by an information processing apparatus configured to use a flash array including the plurality of SSDs 3 as a storage. The information processing apparatus may be a personal computer or a server computer.

The SSD 3 may be used as one of a plurality of storage devices included in a storage array. The storage array may be connected to an information processing apparatus such as a server computer via a cable or a network. The storage array includes a controller which controls a plurality of storage devices in the storage array. When the SSD 3 is applied to the storage array, the controller of the storage array may function as a host of the SSD 3.

An example of a case where an information processing apparatus such as a server computer functions as the host 2 will be described below.

The host (server) 2 and the plurality of SSDs 3 are interconnected via an interface 50 (internal interconnection). As the interface 50 for interconnection, for example, a PCI Express (PCIe) (registered trademark), NVM Express (NVMe) (registered trademark), Ethernet (registered trademark) or NVMe over Fabrics (NVMeOF) may be used. However, it should be noted that the interface 50 is not limited to these examples.

A typical example of the server computer which functions as the host 2 is a server computer (hereinafter referred to as a server) in a data center.

In a case where the host 2 is implemented by the server in the data center, the host (server) 2 may be connected to a plurality of end user terminals (clients) 61 via a network 60. The host 2 can provide various services to the end user terminals 61.

Examples of services which can be provided by the host (server) 2 are (1) Platform as a Service (PaaS) which provides a system running platform for each client (each end user terminal 61), (2) Infrastructure as a Service (IaaS) which provides an infrastructure such as a virtual server for each client (each end user terminal 61), and the like.

A plurality of virtual machines may be executed on a physical server which functions as the host (server) 2. Each of the virtual machines running on the host (server) 2 can function as a virtual server configured to provide various services for the client (end user terminal 61) corresponding to the virtual machine. In each virtual machine, an operating system and a user application used by the corresponding end user terminal 61 are executed. The operating system corresponding to each virtual machine includes an I/O service. The I/O service may be a block I/O service based on a logical block address (LBA) or a key-value store service.

In the operating system corresponding to each virtual machine, the I/O service issues I/O commands (a write command and a read command) in response to a request of write/read from the user application. The I/O commands are placed into a submission queue in the host 2 and transmitted to the SSD 3 via the submission queue.

The controller of the SSD 3 writes the write data from the host 2 to the nonvolatile memory by selectively using a first write mode of writing a plurality of bits per memory cell and a second write mode of writing 1 bit per memory cell.

More specifically, the controller of the SSD 3 writes data to each of a plurality of first storage regions included in the nonvolatile memory in the first write mode of writing a plurality of bits per memory cell, and writes data to a second storage region included in the nonvolatile memory in the second write mode of writing 1 bit per memory cell.

FIG. 2 illustrates a configuration example of the SSD 3.

The SSD 3 includes a controller 4 and a nonvolatile memory (NAND flash memory) 5. The SSD 3 may also include a random access memory, for example, DRAM 6.

The NAND flash memory 5 includes a memory cell array including a plurality of memory cells arranged in a matrix. The NAND flash memory 5 may be a NAND flash memory having a two-dimensional structure or a NAND flash memory having a three-dimensional structure.

The memory cell array of the NAND flash memory 5 includes a plurality of blocks BLK0 to BLKm−1. Each of the blocks BLK0 to BLKm−1 includes a plurality of pages (pages P0 to Pn−1 in this case). Each of the blocks BLK0 to BLKm−1 is a unit for a data erase operation of erasing data. The blocks may also be referred to as erase blocks, physical blocks or physical erase blocks. Each of the pages P0 to Pn−1 includes a plurality of memory cells connected to one word line. Each of the pages P0 to Pn−1 is a unit for a data write operation of writing data and a data read operation of reading data.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be realized by a circuit such as a System-on-a-chip (SoC).

The NAND flash memory 5 includes a single-level cell buffer (SLC buffer) 201 and a quad-level cell region (QLC region) 202 as illustrated in FIG. 3. The quad-level cell region (QLC region) 202 includes a plurality of quad-level cell blocks (QLC blocks).

Each of the plurality of QLC blocks is a block where data are written in a write mode (also referred to as a program mode) to store 4 bits per memory cell. The plurality of QLC blocks are examples of the plurality of first storage regions described above.

In the operation of writing the data to each of the QLC blocks, 4-page data are written to a plurality of memory cells connected to the same word line. The data of 4 bits per memory cell can be thereby written.

The SLC buffer 201 may include a plurality of SLC blocks. Each of the SLC blocks is a block where data are written in a write mode (also referred to as a program mode) to store 1 bit per memory cell. The SLC buffer 201 is an example of the above-mentioned second storage region.

The storage density per memory cell in the SLC block is 1 bit (i.e., 1 page per word line) and the storage density per memory cell in the QLC block is 4 bits (i.e., 4 pages per word line).

The read speed and write speed of the data from and to the NAND flash memory 5 are slower as the storage density is higher and are higher as the storage density is lower. Therefore, the time required to read and write the data from and to the QLC block is longer than the time required to read and write the data from and to the SLC block.

The operation of writing the data to the QLC block is executed by multiple-time write operations (foggy write operation and fine write operation) to a group of a plurality of memory cells connected to the same word line. The first write operation (foggy write operation) is a write operation to roughly set a threshold voltage of each memory cell, and the second write operation (fine write operation) is a write operation to adjust the threshold voltage of each memory cell.

In the first write operation (foggy write operation), 4-page data are first transferred in page size units to the NAND flash memory 5 by a first data transfer operation. That is, when the data size (page size) per page is 16 KB, 64 KB data are transferred in page size units to the NAND flash memory 5. Then, the first write operation (foggy write operation) to program the 4-page data to the memory cell array in the NAND flash memory 5 is executed.

In the second write operation (fine write operation), similarly to the foggy program operation, the 4-page data are transferred again in page size units to the NAND flash memory 5 by the second data transfer operation. The data transferred to the NAND flash memory 5 in the second data transfer operation are the same as the data transferred by the first data transfer operation. Then, the second write operation (fine write operation) to program the transferred 4-page data to the memory cell array in the NAND flash memory 5 is executed.

Furthermore, even if the foggy write operation to a group of memory cells connected to a certain word line is finished, the fine write operation to the group of memory cells connected to this word line cannot be executed immediately. The fine write operation to the group of memory cells connected to this word line can be executed after the foggy write operation to one or more groups of the memory cells connected to one or more subsequent word lines is finished. For this reason, the time required to write the data to the QLC block becomes longer. In addition, the data written to the group of memory cells connected to a certain word line of the QLC block by the foggy write operation cannot be read until the foggy write operation to one or more groups of the memory cells connected to one or more subsequent word lines is finished and the fine write operation to the group of memory cells connected to this word line is finished.

As illustrated in FIG. 4, the NAND flash memory 5 may include a plurality of NAND flash memory chips (NAND flash memory dies). Each of the NAND flash memory chips can operate independently. For this reason, the NAND flash memory chips function as units capable of parallel operations. FIG. 4 illustrates an example of a case where sixteen channels Ch. 1 to Ch. 16 are connected to the NAND interface 13, and two NAND flash memory chips are connected to each of sixteen channels Ch. 1 to Ch. 16. In this case, sixteen NAND flash memory chips #1 to #16 connected to the channels Ch. 1 to Ch. 16 may be organized as bank #0 and the remaining sixteen NAND flash memory chips #17 to #32 connected to the channels Ch. 1 to Ch. 16 may be organized as bank #1. The bank functions as a unit that causes plural memory chips (memory dies) to execute the parallel operation by bank interleaving. In the configuration example of FIG. 4, a maximum of thirty-two NAND flash memory chips can execute the parallel operation by sixteen channels and the bank interleaving using two banks.

An erase operation may be executed in units of single block (physical block) or in units of block group (super block) including a set of plural physical blocks capable of executing the parallel operation. One single parallel unit, i.e., one super block including a set of plural physical blocks is not limited to this, but may include a total of thirty-two physical blocks each selected from the NAND flash memory chips #1 to #32. Each of the NAND flash memory chips #1 to #32 may have a multi-plane structure. For example, when each of the NAND flash memory chips #1 to #32 has a multi-plane structure including two planes, one super block may include a total of sixty-four physical blocks each selected from sixty-four planes corresponding to the NAND flash memory chips #1 to #32.

FIG. 5 illustrates an example of a super block (SB) including thirty-two physical blocks (physical block BLK2 in the NAND flash memory chip #1, physical block BLK3 in the NAND flash memory chip #2, physical block BLK7 in the NAND flash memory chip #3, physical block BLK4 in the NAND flash memory chip #4, physical block BLK6 in the NAND flash memory chip #5, . . . , physical block BLK3 in the NAND flash memory chip #32).

Each of the QLC blocks illustrated in FIG. 3 may be implemented by one super block (QLC super block) or one physical block (QLC physical block). The structure wherein each superblock includes only one physical block may be adopted. In this case, each superblock is equivalent to one physical block.

In the present embodiment, a plurality of physical blocks included in the NAND flash memory 5 are classified into a set of first physical blocks and a set of second physical blocks. The set of the first physical block is organized as a plurality of first storage regions (a plurality of QLC blocks) and the set of the second physical blocks is organized as a second storage region (SLC buffer 201).

The plurality of first storage regions (a plurality of QLC blocks) are used as user data storage regions for storing data (user data) written by the host 2. The first storage regions are not limited to these but, for example, a plurality of zones used in Zoned namespaces (ZNS) defined under NVMe specification. In this case, a logical address space such as LBAs is divided into a plurality of logical address ranges (LBA ranges), and the plurality of logical address ranges (LBA ranges) are assigned to the plurality of first storage regions, respectively.

Next, the configuration of the controller 4 illustrated in FIG. 2 will be described.

The controller 4 can function as a flash translation layer (FTL) configured to execute data management and block management of the NAND flash memory 5. The data management executed by the FTL includes (1) management of mapping information indicative of correspondences between each of logical addresses and each of physical addresses of the NAND flash memory 5, (2) a process for concealing restrictions of the NAND flash memory 5 (for example, read/write operations in units of pages and an erase operation in units of blocks), and the like. The logical address is an address used by the host 2 to designate an address of the location in the logical address space of the SSD 3. As the logical address, a logical block address (addressing) (LBA) may be used.

The management of mapping between each of the logical addresses used by the host 2 to access the SSD 3 and each of the physical addresses of the NAND flash memory 5 is executed by using an address translation table (i.e., a logicalto-physical address translation table: L2P table) 31. The controller 4 may manage mapping between each of the logical addresses and each of the physical addresses in units of predetermined management sizes, by using the L2P table 31. A physical address corresponding to a certain logical address is indicative of the latest physical storage location in the NAND flash memory 5 in which data corresponding to the logical address is written. The L2P table 31 may be loaded from the NAND flash memory 5 into the DRAM 6 when the SSD 3 is powered on.

In the NAND flash memory 5, data can be written to pages only once per erase cycle (program/erase cycle). That is, new data cannot be overwritten directly to the regions in the blocks where data are already written. For this reason, in order to update the already written data, the controller 4 writes new data to an unwritten area in the block (or the other block), and handles the previous data as invalid data. In other words, the controller 4 writes the updating data corresponding to one logical address not into the physical storage location where the previous data corresponding to this logical address is stored, but into the other physical storage location. Then, the controller 4 associates the physical address indicative of the other physical storage location with this logical address by updating the L2P table 31, and invalidates the previous data.

The block management includes management of defective blocks, wear leveling, garbage collection (GC), and the like. The wear leveling is an operation for leveling the respective numbers of rewrite operations (i.e., the numbers of program/erase cycles) for blocks.

GC is an operation of increasing the number of free blocks. The free block is indicative of a block including no valid data. In GC, the controller 4 copies valid data in several blocks where the valid data and invalid data exist together to the other block (for example, a free block). The valid data is indicative of data associated with a certain logical address. For example, data referred to by the L2P table 31 (i.e., data linked to the logical address as the latest data) is valid data and may be read later by the host 2. The invalid data is indicative of data which is not associated with any logical addresses. The data which is not associated with any logical addresses is data which may not be read any more by the host 2. Then, the controller 4 updates the L2P table 31 and maps the logical addresses of copied valid data to copy destination physical addresses, respectively. A block where only invalid data are stored after valid data are copied to the other block is released as a free block. This block can be thereby reused for data write after an erase operation of this block is executed.

The controller 4 includes a host interface 11, a CPU 12, a NAND interface 13, a DRAM interface 14, a direct memory access controller (DMAC) 15, a static RAM (SRAM) 16, an ECC encode/decode unit 17, and the like. The host interface 11, the CPU 12, the NAND interface 13, the DRAM interface 14, the DMAC 15, the SRAM 16, and the ECC encode/decode unit 17 are interconnected via the bus 10.

The host interface 11 is a host interface circuit configured to execute communication with the host 2. The host interface 11 may be, for example, a PCIe controller (NVMe controller). Alternatively, when the SSD 3 is configured to be connected to the host 2 via Ethernet (registered trademark), the host interface 11 may be an NVMe over Fabrics (NVMeOF) controller.

The host interface 11 receives various commands from the host 2. These commands include a write command, a read command, an inactive command, an allocate command, a deallocate command, and the like.

The write command is a command (write request) to write data to be written (write data) to the NAND flash memory 5, and includes, for example, a logical address (starting LBA) of write data, the data size of the write data, a data pointer (buffer address) indicative of a location in a write buffer of the host 2 where the write data is stored, and the like.

The SSD 3 may be implemented as a first-type SSD supporting Zoned Namespaces (ZNS). In the first-type SSD, an upper bit portion of the logical address included in the write command may be used as an identifier specifying a write destination storage region (write destination QLC block) where write data associated with this write command is to be written.

Alternatively, the SSD 3 may be implemented as a second-type SSD supporting stream write. In the second-type SSD, a stream ID included in the write command may be used as an identifier specifying a write destination storage region (write destination QLC block) where write data associated with this write command is to be written.

Alternatively, the SSD 3 may be implemented as a third-type SSD. In the third-type SSD, the controller 4 determines the write destination storage region (write destination QLC block) and the write destination location (write destination page) in the write destination storage region, and notifies the host 2 of the determined write destination storage region and the determined write destination location.

In the third-type SSD, the controller 4 receives from the host 2 a block allocate request to specify ID such as QoS domain ID. The QoS domain corresponds to a storage region in the NAND flash memory 5. The controller 4 allocates the write destination storage region to be used for QoS domain ID included in this block allocate request. The write destination storage region may be implemented by a physical block (QLC physical block) or a block group (QLC super block) including several QLC physical blocks. The write command (write request) received from the host 2 includes a QoS domain ID, a logical address, a size of data to be written (write data), and the like. The controller 4 sequentially writes the write data to the write destination storage region allocated to the QoS domain ID included in the write request. Then, the controller 4 notifies the host 2 of the physical address (block address and offset) indicative of the physical storage location where the write data is written. In the third-type SSD, the L2P table 31 is managed by not the controller 4, but the host 2.

The read command is a command (read request) to read data from the NAND flash memory 5.

The read command issued in each of the first-type SSD and the second-type SSD includes a logical address (starting LBA) of data to be read, the size of the data, a data pointer (buffer address) indicative of a location in a read buffer of the host 2 to which the data is to be transferred, and the like.

The read command issued in the third-type SSD includes a physical address indicative of a physical storage location where the data to be read is stored, the size of the data, a data pointer (buffer address) indicative of a location in the read buffer of the host 2 to which the data is to be transferred, and the like.

The allocate command is a command (request) to allocate one of a plurality of first storage regions (a plurality of QLC blocks) as the write destination storage region (write destination QLC block). The write destination QLC block is indicative of a QLC block allocated as a write destination storage region where writing of data can be executed, i.e., a QLC block in an open state. The open zone command used in Zoned Namespaces is an example of the allocate command.

The inactive command is a command (request) to cause the state of the write destination storage region (write destination QLC block) to transition from a first state (open state) of being allocated as the write destination storage region where writing of data can be executed to a second state (inactive state) in which the writing is suspended. The close zone command used in Zoned Namespaces is an example of the inactive command.

The deallocate command is a command (request) to set the first storage region (QLC block) which is filled with data to a free block. The reset zone command used in Zoned Namespaces is an example of the deallocate command.

The CPU 12 is a processor configured to control the host interface 11, the NAND interface 13, the DRAM interface 14, the DMAC 15, the SRAM 16, and the ECC encode/decode unit 17. The CPU 12 loads a control program (firmware) from the NAND flash memory 5 or a ROM (not illustrated) into the DRAM 6 in response to power-on of the SSD 3, and performs various processes by executing the firmware. The firmware may be loaded on the SRAM 16. The CPU 12 can execute command processes for processing various commands from the host 2, and the like. The operations of the CPU 12 are controlled by the above-mentioned firmware. A part or all parts of the command processes may be executed by dedicated hardware in the controller 4.

The CPU 12 can function as a flash management unit 21 and a dispatcher 22. A part or all parts of each of the flash management unit 21 and the dispatcher 22 may also be implemented by dedicated hardware in the controller 4.

In response to receiving from the host 2 each of the write requests to write the write data to a first write destination QLC block allocated from a plurality of QLC blocks, the flash management unit 21 transfers the write data associated with a set of received requests from the write buffer of the host 2 to the internal buffer 161 of the controller 4. A part of the memory region of the SRAM 16 may be used as the internal buffer 161 or a part of the memory region of the DRAM 6 may be used as the internal buffer 161.

Then, the flash management unit 21 does not write the write data transferred to the internal buffer 161 to the SLC buffer 201, but writes the write data to the first write destination QLC block in a write mode (for example, foggy fine mode) of writing 4 bits per memory cell.

When receiving from the host 2 a first request (inactivate command) to cause the first write destination QLC block to transition from the first state (open state) of being allocated as the write destination block where writing of data can be executed to the second state (inactive state) in which the writing is suspended, the flash management unit 21 transfers remaining write data (un-transferred write data) associated with one or more first write requests of the received write requests for the first write destination QLC block, from the write buffer of the host 2 to the internal buffer 161. The remaining write data are write data un-transferred to the internal buffer 161.

Then, the flash management unit 21 writes the remaining write data (un-transferred write data) transferred to the internal buffer 161 to the SLC buffer 201 in a write mode of writing 1 bit per memory cell, and causes the state of the first write destination QLC block to transition from the first state (open state) to the second state (inactive state). Since the time required writing the remaining write data (un-transferred write data) to the SLC buffer 201 is short, an area in the write buffer of the host 2 allocated for the first write destination QLC block can be rapidly released.

After the first write destination QLC block is opened again, i.e., caused to transition from the inactive state to the open state, the remaining write data (un-transferred write data) written to the SLC buffer 201 is written to the first write destination QLC block.

Thus, the write data is written to the only first write destination QLC block without being written to the SLC buffer 201 in a period before the first request (inactivate command) to cause the first write destination QLC block to transition to the second state (inactive state) in which the writing is suspended is received.

Therefore, the total amount of data written to the SLC buffer 201 can be reduced as compared to a case (case A) of executing a process of writing all write data to both the SLC buffer 201 and the first write destination QLC block and a case (case B) of executing a process of first writing all write data to the only SLC buffer 201 and then writing back the write data from the SLC buffer 201 to the first write destination QLC block when the SSD is idle.

As a result, since the number of blocks (SLC blocks) necessary to be allocated as the SLC buffer 201 can be reduced, the number of blocks (QLC blocks) which can be allocated as the QLC region 202 can be thereby increased.

The dispatcher 22 acquires commands from one or more submission queues of the host 2. In the controller 4, a plurality of command queues corresponding to a plurality of QLC blocks in the open state (a plurality of write destination QLC blocks) are managed. The dispatcher 22 classifies the acquired commands into write commands (write requests) and commands other than the write commands.

Furthermore, the dispatcher 22 classifies the write commands alone into a plurality of groups corresponding to the plurality of write destination QLC blocks. Then, the dispatcher 22 stores write commands belonging to same group in the command queue corresponding to this group.

For example, the dispatcher 22 stores each write command to write data to the write destination QLC block #1 in the command queue corresponding to the write destination QLC block #1, and stores each write command to write data to the write destination QLC block #2 in the command queue corresponding to the write destination QLC block #2.

When the total size of the write data associated with a set of write commands to write the data to the write destination QLC block #1 reaches the minimum write size of the NAND flash memory 5, the flash management unit 21 transfers the write data associated with the set of write commands, which have the minimum write size, from the write buffer of the host 2 to the internal buffer 161.

In addition, when the total size of the write data associated with a set of write commands to write the data to the write destination QLC block #2 reaches the minimum write size of the NAND flash memory 5, the flash management unit 21 transfers the write data associated with the set of write commands, which have the minimum write size, from the write buffer of the host 2 to the internal buffer 161.

Thus, it is possible to suppress the internal buffer 161 occupied by a number of write data having less than the minimum write size that cannot be written to the NAND flash memory 5, by transferring the write data in units of the minimum write size from the write buffer of the host 2 to the internal buffer 161, and the capacity of the internal buffer 161 considered necessary to be allocated can be thereby reduced.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the memory region of the DRAM 6 may be used for storing the L2P table 31 and the block management table 32. The zone management table 32 is used for storing the management information corresponding to each of the plurality of QLC blocks. Incidentally, the internal buffer 161 may not be arranged in the SRAM 16, but may be arranged in the DRAM 6.

The DMAC 15 executes data transfer between the write buffer of the host 2 and the internal buffer 161 under control of the CPU 12. When the write data is to be transferred from the write buffer of the host 2 to the internal buffer 161, the CPU 12 specifies for the DMAC 15 a transfer source address indicative of a location in the write buffer of the host 2, the size of the data to be transferred, and a transfer destination address indicative of a location in the internal buffer 161.

When the data is to be written to the NAND flash memory 5, the ECC encode/decode unit 17 encodes the data (data to be written) (ECC encoding), thereby adding an error correction code (ECC) to the data as a redundant code. When the data is read from the NAND flash memory 5, the ECC encode/decode unit 17 uses the ECC added to the read data to execute error correction of the read data (ECC decoding).

Figure 6:
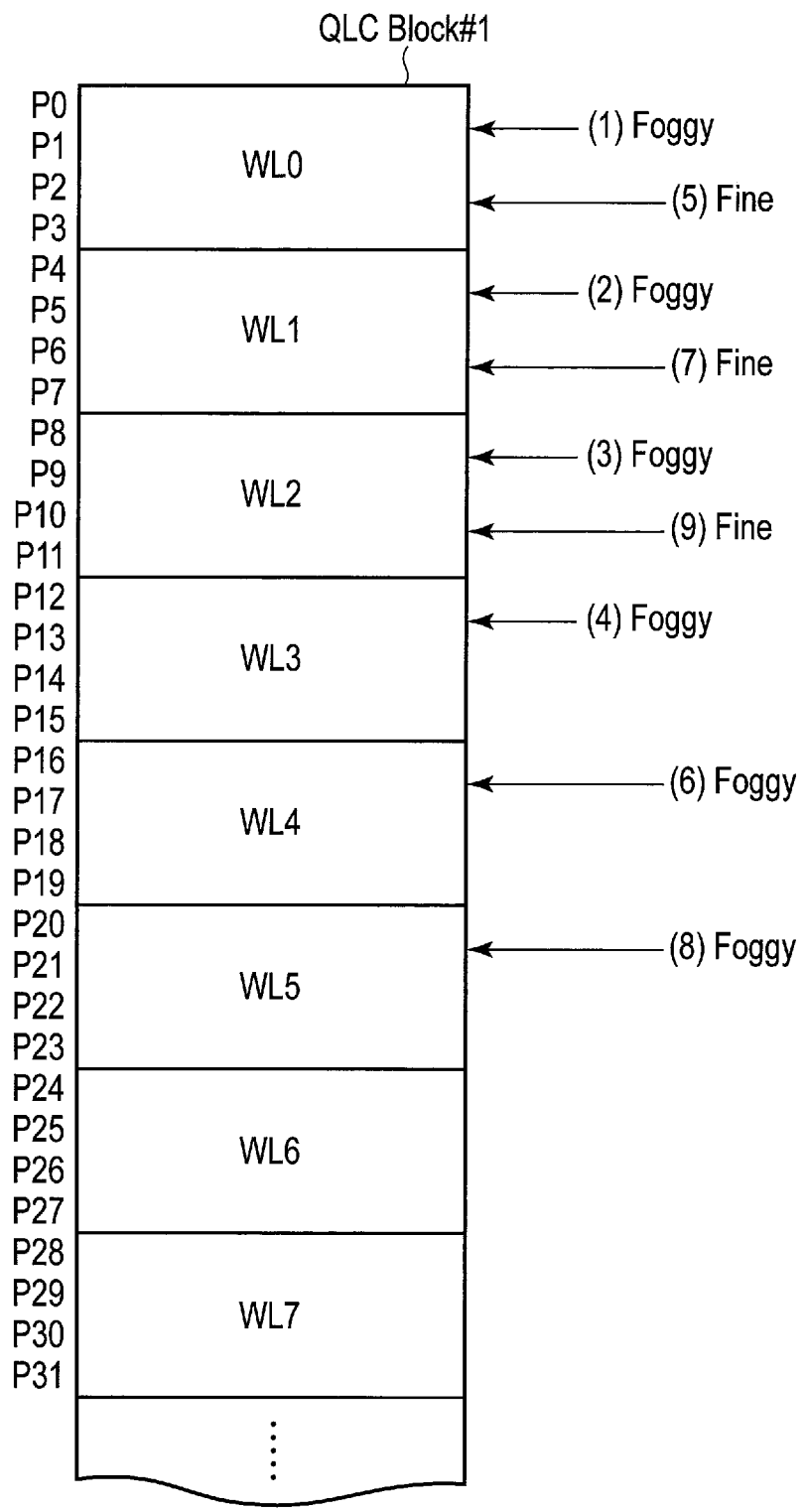
FIG. 6 is a diagram illustrating a foggy-fine write operation executed in the memory system according to the embodiment.

FIG. 6 is a diagram illustrating a foggy-fine write operation executed in the SSD 3.

An example of the foggy-fine write operation executed across four word lines will be described. The foggy-fine write operation to the write destination QLC block #1 is executed in the following manner.

(1) First, write data of four pages (P0 to P3) is transferred to the NAND flash memory 5 in a page unit, and the foggy write operation for writing the write data of the four pages (P0 to P3) to a plurality of memory cells connected to a word line WL0 in the write destination QLC block #1 is executed.

(2) Next, write data of next four pages (P4 to P7) is transferred to the NAND flash memory 5 in a page unit, and the foggy write operation for writing the write data of the four pages (P4 to P7) to a plurality of memory cells connected to a word line WL1 in the write destination QLC block #1 is executed.

(3) Next, write data of next four pages (P8 to P11) is transferred to the NAND flash memory 5 in a page unit, and the foggy write operation for writing the write data of the four pages (P8 to P11) to a plurality of memory cells connected to a word line WL2 in the write destination QLC block #1 is executed.

(4) Next, write data of next four pages (P12 to P15) is transferred to the NAND flash memory 5 in a page unit, and the foggy write operation for writing the write data of the four pages (P12 to P15) to a plurality of memory cells connected to a word line WL3 in the write destination QLC block #1 is executed.

(5) When the foggy write operation to the plurality of memory cells connected to the word line WL3 is finished, a write target word line returns to the word line WL0 such that the fine write operation to the plurality of memory cells connected to the word line WL0 can be executed. Then, the same write data of four pages (P0 to P3) as the write data of the four pages (P0 to P3) used in the foggy write operation to the word line WL0 is transferred again to the NAND flash memory 5 in a page unit and the fine write operation for writing the write data of the four pages (P0 to P3) to the plurality of memory cells connected to the word line WL0 in the write destination QLC block #1 is executed. The foggy-fine write operation for pages P0 to P3 is thereby finished. As a result, the data corresponding to the pages P0 to P3 can be read correctly from the write destination QLC block #1.

(6) Next, write data of next four pages (P16 to P19) is transferred to the NAND flash memory 5 in a page unit, and the foggy write operation for writing the write data of the four pages (P16 to P19) to a plurality of memory cells connected to a word line WL4 in the write destination QLC block #1 is executed.

(7) When the foggy write operation to the plurality of memory cells connected to the word line WL4 is finished, a write target word line returns to the word line WL1 such that the fine write operation to the plurality of memory cells connected to the word line WL1 can be executed. Then, the same write data of four pages (P4 to P7) as the write data of the four pages (P4 to P7) used in the foggy write operation to the word line WL1 is transferred again to the NAND flash memory 5 in a page unit and the fine write operation for writing the write data of the four pages (P4 to P7) to the plurality of memory cells connected to the word line WL1 in the write destination QLC block #1 is executed. The foggy-fine write operation for pages P4 to P7 is thereby finished. As a result, the data corresponding to the pages P4 to P7 can be read correctly from the write destination QLC block #1.

(8) Next, write data of next four pages (P20 to P23) is transferred to the NAND flash memory 5 in a page unit, and the foggy write operation for writing the write data of the four pages (P20 to P23) to a plurality of memory cells connected to a word line WL5 in the write destination QLC block #1 is executed.

(9) When the foggy write operation to the plurality of memory cells connected to the word line WL5 is finished, a write target word line returns to the word line WL2 such that the fine write operation to the plurality of memory cells connected to the word line WL2 can be executed. Then, the same write data of four pages (P8 to P11) as the write data of the four pages (P8 to P11) used in the foggy write operation to the word line WL2 is transferred again to the NAND flash memory 5 in a page unit and the fine write operation for writing the write data of the four pages (P8 to P11) to the plurality of memory cells connected to the word line WL2 in the write destination QLC block #1 is executed. The foggy-fine write operation for pages P8 to P11 is thereby finished. As a result, the data corresponding to the pages P8 to P11 can be read correctly from the write destination QLC block #1.

Figure 7:
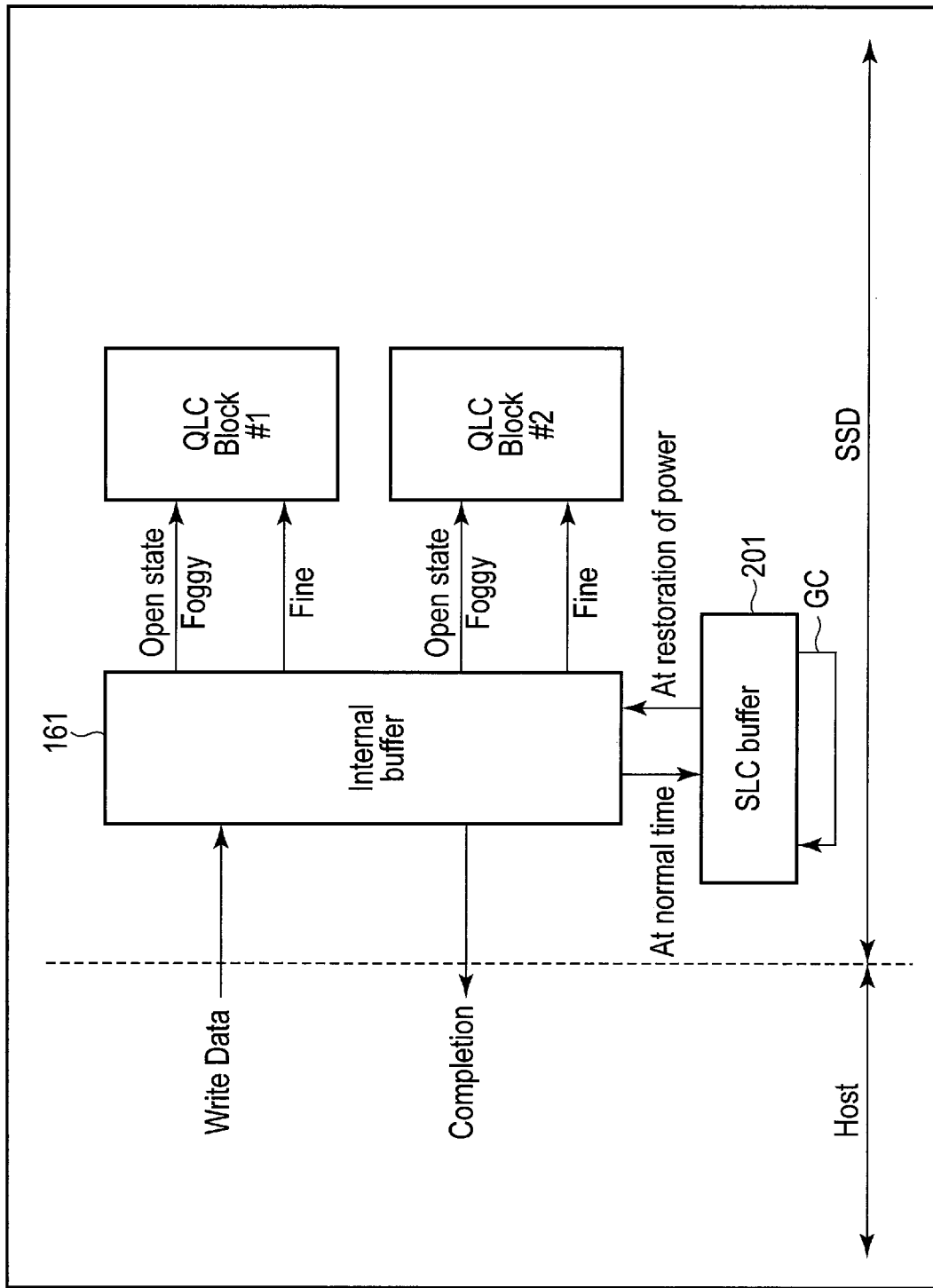
FIG. 7 is a diagram illustrating an operation of controlling the QLC blocks and the SLC buffer, which is executed in a SSD according to a comparative example.

FIG. 7 is a diagram illustrating an operation of controlling QLC blocks and an SLC buffer executed in a SSD according to a comparative example.

(Case A)

In the SSD of the comparative example, all write data received from the host are written to both the QLC blocks and the SLC buffer 201.

First, every time each of the write requests for the write destination QLC block #1 or the write destination QLC block #2 is received from the host 2, the write data associated with each of the received write requests is received from the host 2 and stored in the internal buffer 161.

The write data stored in the internal buffer 161 is written to the SLC buffer 201 and is also written to the write destination QLC block #1 (or write destination QLC block #2). When the write data corresponding to a certain write request is written to the SLC buffer 201, a response indicative of completion (Completion) of the write request is returned to the host 2.

The write data stored in the SLC buffer 201 is used for the purpose of, for example, restoring the content of the internal buffer 161 lost due to power loss such as power failure. That is, the content of the internal buffer 161 is restored using the write data stored in the SLC buffer 201 when the power for the SSD is restored.

(Case B)

In the SSD of the comparative example, first, all write data received from the host are written to the only SLC buffer 201. The write data stored in the SLC buffer 201 are written to the write destination QLC block #1 (or write destination QLC block #2) when the SSD is idle.

In the SSD according to the comparative example, in any one of cases A and B, the data of the same amount as the total amount of the data written to the QLC region 202 need to be written to the SLC buffer 201. For this reason, the capacity of the SLC buffer 201 which needs to be allocated tends to increase, and the efficiency of use of the storage region of the NAND flash memory 5 may be thereby lowered.

FIG. 8 is a diagram illustrating an operation of controlling the QLC blocks and the SLC buffer, which is executed in the SSD 3 according to the embodiment.

In the SSD 3 according to the embodiment, all write data received from the write buffer 51 of the host 2 are written to the only write destination QLC block #1 (or write destination QLC block #2) via the internal buffer 161 in the write mode of writing 4 bits per memory cell (for example, the foggy-fine write operation) and are not written to the SLC buffer 201, until the inactivate command (inactivate request) to cause the state of the write destination QLC block #1 (or write destination QLC block #2) to transition to the inactive state in which the writing is suspended is received from the host 2.

Writing the data to each of the write destination QLC block #1 and the write destination QLC block #2 is executed by, for example, the foggy-fine write operation. When both the foggy write operation for writing the write data to a plurality of memory cells connected to a certain word line and the fine write operation for writing the write data to the plurality of memory cells connected to this word line are finished, responses indicative of the completion (Completion) of the write requests corresponding to the write data are returned to the host.

When the inactivate command (inactivate request) to cause the state of the write destination QLC block #1 (or the write destination QLC block #2) to transition to the inactive state in which the writing is suspended is received from the host 2, the write data un-transferred to the internal buffer 161 is transferred from the write buffer 51 of the host 2 to the internal buffer 161.

For example, when the inactivate command (inactivate request) for the write destination QLC block #1 is received from the host 2, the remaining write data which are not transferred to the internal buffer 161, of the write data associated with the received write requests to write the data to the write destination QLC block #1, are transferred from the write buffer 51 of the host 2 to the internal buffer 161. For example, when the received write requests to write the data to the write destination QLC block #1 are write requests W1 to W5 and the write requests whose write data are not transferred to the internal buffer 161 are the write requests W4 and W5, the write data associated with the write request W4 and the write data associated with the write request W5 are transferred from the write buffer 51 of the host 2 to the internal buffer 161 as the remaining write data.

Then, the remaining write data transferred to the internal buffer 161 are not written to the write destination QLC block #1, but written to the only SLC buffer 201 in the write mode of writing 1 bit per memory cell. When the remaining write data are written to the SLC buffer 201, the state of the write destination QLC block #1 is caused to transition from the open state to the inactive state. Furthermore, one or more responses indicative of completion of one or more write requests corresponding to the remaining write data and a response indicative of completion of the inactivate request are returned to the host 2.

In response to receiving the response indicative of the completion of the inactivate request, the host 2 becomes capable of releasing the area in the write buffer 51 allocated for the write destination QLC block #1 and can reuse this area as, for example, an area for the write destination QLC block to be newly opened.

When a write request to write again data to the QLC block #1 in the inactive state is received from the host 2, the QLC block #1 is opened again as the write destination QLC block by the controller 4. Then, the above-mentioned remaining data stored in the SLC buffer 201 are read from the SLC buffer 201, and the remaining data read from the SLC buffer 201 are written to the internal buffer 161. The remaining data written to the internal buffer 161 are written to the write destination QLC block #1 at the timing at which the data become capable of being written to the write destination QLC block #1.

Figure 9:
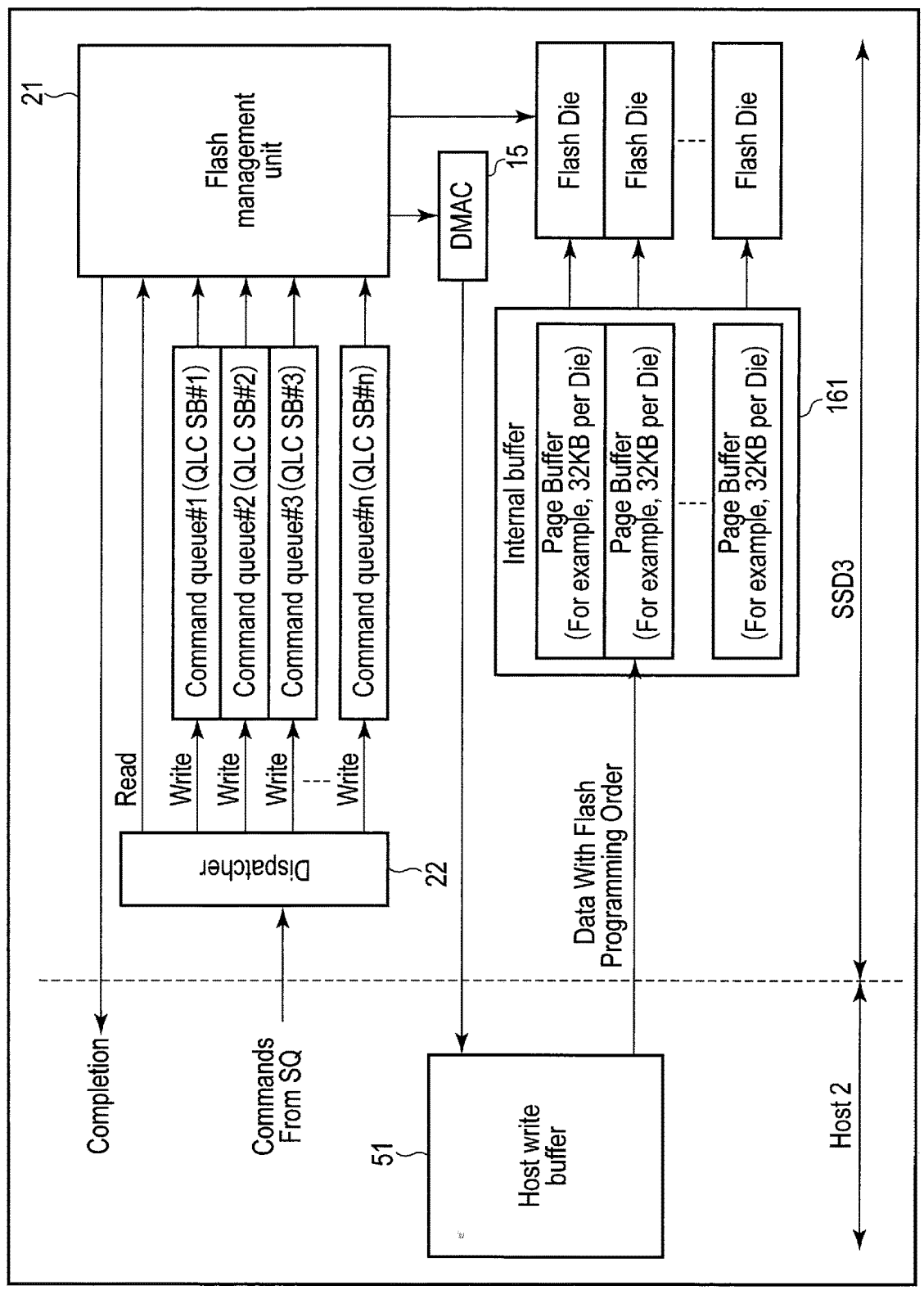
FIG. 9 is a block diagram illustrating a write operation executed in the memory system according to the embodiment.

FIG. 9 is a block diagram illustrating the write operation executed in the SSD 3.

In the following descriptions, it is assumed that each of the plurality of first storage regions is implemented by a block group (QLC super block) including a plurality of physical blocks.

In the controller 4 of the SSD 3, a plurality of command queues corresponding to a plurality of write destination QLC super blocks (QLC SB) in the open state are managed. The command queue #1 is used to store write requests to write data to the write destination QLC super block (QLC SB #1). The command queue #2 is used to store write requests to write data to the write destination QLC super block (QLC SB #2). The command queue #3 is used to store write requests to write data to the write destination QLC super block (QLC SB #3). The command queue #n is used to store write requests to write data to the write destination QLC super block (QLC SB #n).

Each of the commands stored in the submission queue (SQ) of the host 2 is fetched by the dispatcher 22. Then, each of the write requests to write data to the write destination QLC super block (QLC SB #1) is stored in the command queue #1 by the dispatcher 22, each of the write requests to write data to the write destination QLC super block (QLC SB #2) is stored in the command queue #2 by the dispatcher 22, each of the write requests to write data to the write destination QLC super block (QLC SB #3) is stored in the command queue #3 by the dispatcher 22, and each of the write requests to write data to the write destination QLC super block (QLC SB #n) is stored in the command queue #n by the dispatcher 22.

As regards each of the command queues, the total size of the write data associated with a set of the stored write requests is checked by the flash management unit 21. Then, when the total size of the write data associated with a set of the write requests stored in a certain command queue reaches the minimum write size such as the page size, the write data having the minimum write size is transferred from the write buffer 51 of the host 2 to the internal buffer 161 by the DMAC 15 under control of the flash management unit 21.

Thus, since it is possible to suppress the internal buffer 161 occupied by a plurality of write data to be written to the plurality of write destination QLC super blocks, each of the plurality of write data having a size smaller than the page size, the necessary capacity of the internal buffer 161 can be reduced.

In addition, the transfer of the write data from the write buffer 51 of the host 2 to the internal buffer 161 is executed in the same order as the order in which the write data are written to the NAND flash memory 5, not the order in which the write requests are fetched. Thus, even when the plurality of write destination QLC super blocks are in the open state, the write data to be written to a desired write destination QLC super block can be acquired efficiently from the write buffer 51 of the host 2.

Figure 10:
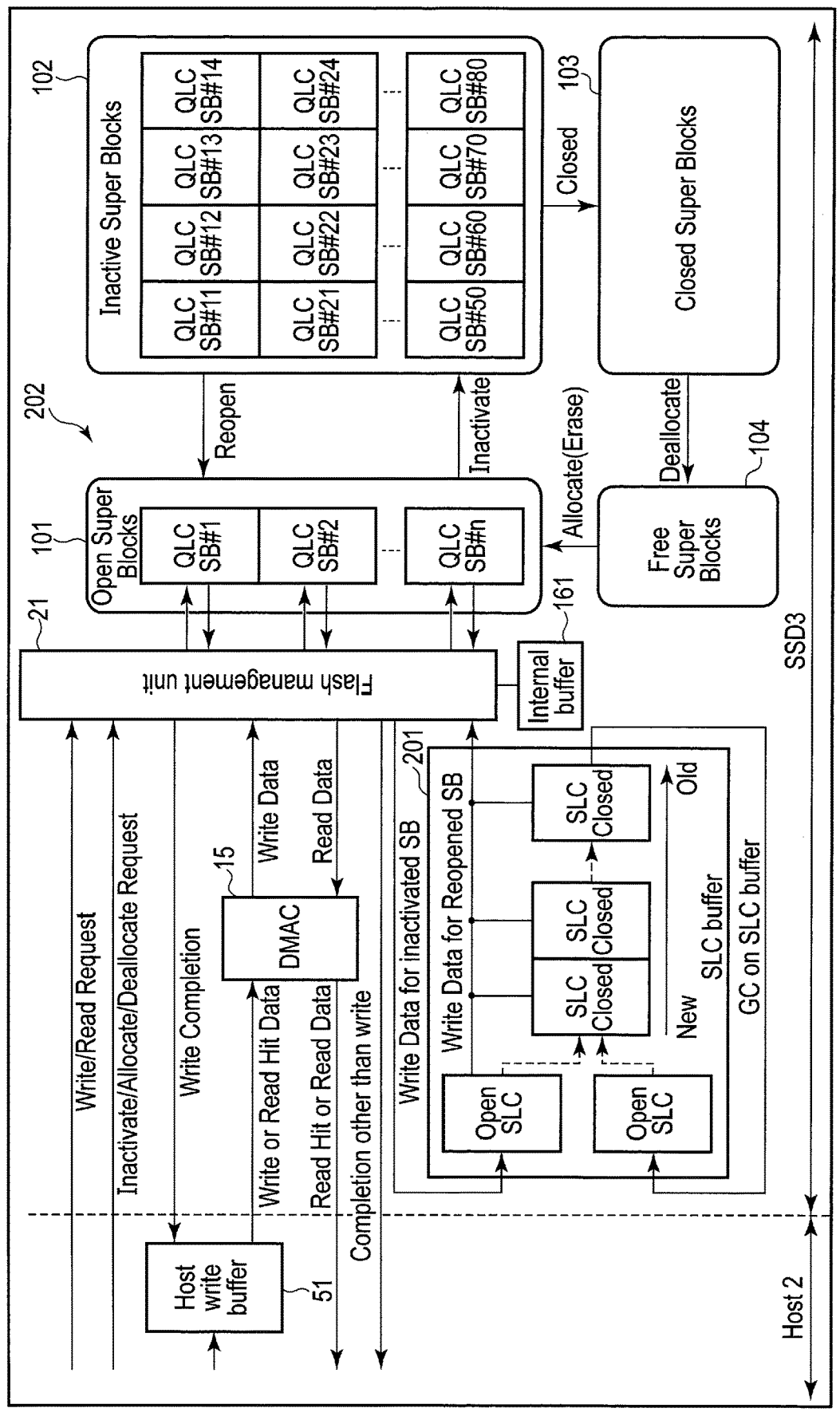
FIG. 10 is a block diagram illustrating a sequence of the write operation and a sequence of the read operation, which are executed in the memory system according to the embodiment.

FIG. 10 is a block diagram illustrating a sequence of the write operation and a sequence of the read operation, which are executed in the SSD 3.

In the present embodiment, states of each QLC super block (QLC SB) are roughly classified into an open state (open super block), an inactive state (inactive super block), closed state (closed super block), and a free state (inactive super block). Different logical address ranges are assigned to the respective QLC super blocks (QLC SB). The host 2 may be configured to sequentially execute the writing data to each of the QLC super blocks.

The QLC super block in the open state is a QLC super block used as the write destination storage region. Each of the QLC super blocks in the open state is managed by an open super block list 101.

The QLC super block in the inactive state is a QLC super block in which the writing is suspended. In each of the QLC super blocks in the inactive state, several pages available for data write remain. Each of the QLC super blocks in the inactive state is managed by an inactive super block list 102.

The QLC super block in the closed state is a QLC super block in which the whole super block is filled with data. Each of the QLC super blocks in the closed state is managed by a closed super block list 103.

The QLC super block in the free state is a free QLC super block reset to the state of including no valid data. Each of the QLC super blocks in the free state is managed by a free super block list 104.

The host 2 can open a plurality of QLC super blocks by repeating a process of transmitting an allocate command to the SSD 3.

When the flash management unit 21 receives from the host 2 the write requests to write the data to the QLC super block (for example, QLC SB #1) in the open state, the flash management 21 transfers the write data associated with a set of the received write requests from the write buffer 51 of the host 2 to the internal buffer 161 by using the DMAC 15. Then, the flash management unit 21 does not write the write data transferred to the internal buffer 161 to the SLC buffer 201, but writes the write data to the QLC super block (QLC SB #1).

In addition, when the flash management unit 21 receives from the host 2 the write requests to write the data to the QLC super block (for example, QLC SB #2) in the open state, the flash management 21 transfers the write data associated with a set of the received write requests from the write buffer 51 of the host 2 to the internal buffer 161 by using the DMAC 15. Then, the flash management unit 21 does not write the write data transferred to the internal buffer 161 to the SLC buffer 201, but writes the write data to the QLC super block (QLC SB #2).

When writing the data to a certain QLC super block in the open state is not executed for a while, the host 2 transmits to the SSD 2 an inactive request to cause the state of this QLC super block to transition from the open state to the inactive state such that the area in the write buffer 51 of the host 2 allocated for this QLC super block can be released.

When the inactivate request to cause the QLC super block (QLC SB #1) to transition to the inactive state is received from the host 2, the flash management unit 21 transfers the remaining write data associated with one or more write requests of the received write requests for the QLC super block (QLC SB #1), from the write buffer 51 of the host 2 to the internal buffer 161, by using the DMAC 15. The remaining write data are write data un-transferred to the internal buffer 161. The flash management unit 21 does not write the remaining write data transferred to the internal buffer 161 to the QLC super block (QLC SB #1), but writes the write data transferred to the internal buffer 161 to the SLC buffer 201.

When the write data which does not finish being written to the QLC SB #1, for example, the write data which finishes the only foggy write operation and does not finish the fine write operation exists in the internal buffer 161, the flash management unit 21 does not write this write data to the QLC super block (QLC SB #1), but writes this write data to the SLC buffer 201. Then, the flash management unit 21 removes the QLC super block (QLC SB #1) from the open super block list 101 and adds the QLC super block (QLC SB #1) to the inactive super block list 102.

The SLC buffer 201 may include a plurality of SLC blocks. The remaining write data are written to the write destination SLC block in the open state in the SLC buffer 201, in the write mode of writing 1 bit per memory cell. When the whole write destination SLC block is filled with the data, the write destination SLC block is managed as the SLC block in the closed state.

The oldest SLC block of a set of the SLC blocks in the closed state, is selected as a copy source block for GC. Then, the data stored in the copy source block is copied to the write destination SLC block for GC, and the copy source block is released as a free SLC block.

The QLC super block (QLC SB #1) in the inactive state includes a page available for writing data. Therefore, the host 2 can transmit to the SSD 3 the write requests to write the data to the remaining available pages in the QLC super block (QLC SB #1) in the inactive state, as needed.

When receiving from the host 2 one or more write requests to write the data to the QLC super block (QLC SB #1), the flash management unit 21 reads the write data for the QLC super block (QLC SB #1) which is stored in the SLC buffer 201 from the SLC buffer 201 and writes the read write data to the internal buffer 161. Thus, the write data for the QLC super block (QLC SB #1) is thereby transferred from the SLC buffer 201 to the internal buffer 161. Then, new write data to the QLC super block (QLC SB #1) received from the host 2 and the write data transferred from the SLC buffer 201 to the internal buffer 161 are written to the QLC super block (QLC SB #1).

In addition, when receiving the read request from the host 2, the flash management unit 21 determines which of the plurality of QLC super blocks, the SLC buffer 201, and the internal buffer 161 the read target data specified by the read request is stored in.

When the read target data is stored in one of the plurality of QLC super blocks, the flash management unit 21 reads the read target data from the QLC super block and transmits the read target data to the host 2. In this case, the flash management unit 21 transfers the read target data to the read buffer of the host 2 by using the DMAC 15.

When the read target data is not stored in any one of the plurality of QLC super blocks but stored in the SLC buffer 201, the flash management unit 21 reads the read target data from the SLC buffer 201 and transmits the read target data to the host 2. In this case, the flash management unit 21 transfers the read target data to the read buffer of the host 2 by using the DMAC 15.

When the read target data is not stored in any one of the plurality of QLC super blocks, the SLC buffer 201, and the internal buffer 161 but stored in the write buffer 51 of the host 2, the flash management unit 21 notifies the host 2 of an information indicating that the read target data does not exist in the SSD 3.

Alternatively, when the read target data is not stored in any one of the plurality of QLC super blocks, the SLC buffer 201, and the internal buffer 161 but stored in the write buffer 51 of the host 2, the flash management unit 21 may notify the host 2 of an information indicative of the location in the write buffer 51 of the host 2 where the read target data is stored.

When all the data stored in the QLC super block in the closed state which is filled with data becomes unused unnecessary data, the host 2 can transmit the deallocate request for the QLC super block to the SSD 3. In accordance with receiving the deallocate request from the host 2, the controller 4 causes the state of this QLC super block to transition from the closed state to the free state.

When the host 2 wishes to write the data to this QLC super block, the host 2 transmits the allocate request for the QLC super block to the SSD 3. In accordance with receiving the allocate request from the host 2, the controller 4 opens this QLC super block and causes the state of the QLC super block to transition from the free state to the open state by executing the erase operation for the QLC super block.

Figure 11:
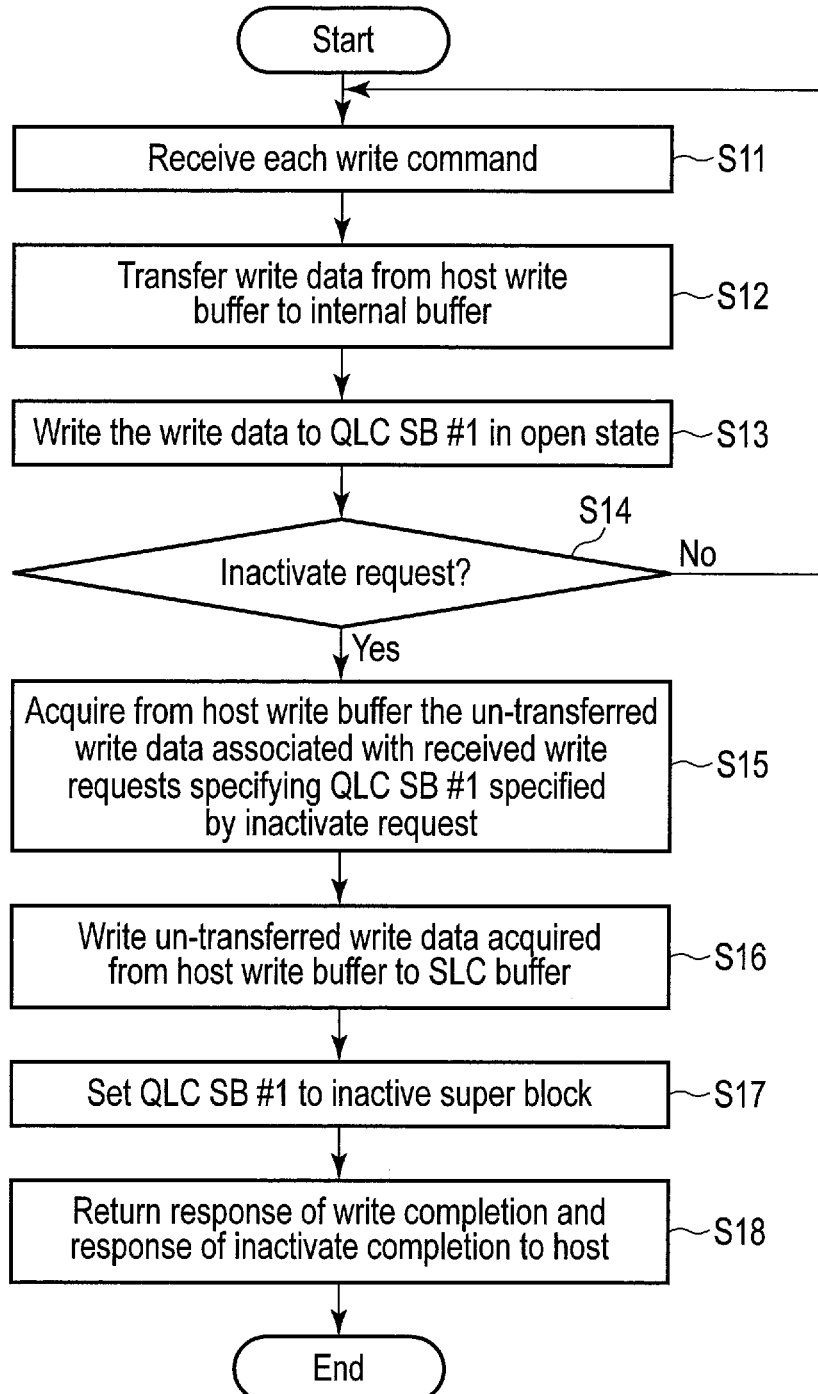
FIG. 11 is a flowchart illustrating a procedure of the write operation and a procedure of an operation of causing a QLC super block in an open state to transition to an inactive state, the operations being executed in the memory system according to the embodiment.

FIG. 11 is a flowchart illustrating a procedure of the write operation and a procedure of an operation of causing the QLC super block in the open state to transition to the inactive state. These operations are executed in the SSD 3.

An example of writing the write data to the write destination QLC super block (QLC SB #1) allocated from the plurality of QLC super blocks will be described but, when a plurality of write destination QLC super blocks are allocated, a process similar to the process of writing the write data to the write destination QLC super block (QLC SB #1) is executed for each of the plurality of write destination QLC super blocks. Each of the write destination QLC super blocks is the QLC super block in the open state.

The controller 4 of the SSD 3 receives from the host 2 the write requests (write commands) to write the data to the write destination QLC super block (QLC SB #1) (step S11).

The controller 4 transfers the write data associated with a set of the received write requests, in page size units, from the write buffer 51 of the host 2 to the internal buffer 161 (step S12).

The controller 4 writes the write data transferred to the internal buffer 161 to the write destination QLC super block (QLC SB #1) in the write mode of writing 4 bits per memory cell, for example, by the foggy-fine write operation (step S13).

The processes of steps S11 to S13 are repeated until the inactivate request to cause the state of the write destination QLC super block (QLC SB #1) to transition to the inactive state is received from the host 2.

When receiving from the host 2 the inactivate request to cause the write destination QLC super block (QLC SB #1) to transition to the inactive state (YES in step S14), the controller 4 acquires from the write buffer 51 of the host 2 the un-transferred write data associated with the received write requests for the write destination QLC super block (QLC SB #1), i.e., the remaining write data (un-transferred write data) associated with one or more write requests of the received write requests for the write destination QLC super block (QLC SB #1), the remaining write data being data un-transferred to the internal buffer 161, and stores the acquired remaining write data in the internal buffer 161 (step S15).

To rapidly execute the process of persistently storing the remaining write data to be written to the write destination QLC super block caused to transition to the inactive state, the controller 4 does not write the acquired write data to the write destination QLC super block (QLC SB #1) but writes the acquired write data to the SLC buffer 201 (step S16), and causes the state of the write destination QLC super block (QLC SB #1) to transition to the inactive state (step S17).

Next, the controller 4 transmits to the host 2 one or more responses indicative of completion of one or more write requests corresponding to the remaining write data (un-transferred write data) which are written to the SLC buffer 201, and a response indicative of completion of the inactivate request (step S18). Thus, the host 2 can release the area in the write buffer 51 of the host 2, which is allocated for the write destination QLC super block (QLC SB #1).

FIG. 12 is a flowchart illustrating a procedure of an operation of reopening the QLC super block in the inactive state.

When receiving from the host 2 the write request to write the data to the QLC super block (QLC SB #1) in the inactive state (YES in step S21), the controller 4 reopens the QLC super block (QLC SB #1) and causes the state of QLC super block (QLC SB #1) to transition from the inactive state to the open state (step S22).

Then, the controller 4 transfers the write data for the QLC super block (QLC SB #1) stored in the SLC buffer 201 from the SLC buffer 201 to the internal buffer 161 (step S23), and executes a write process of writing to the QLC super block (QLC SB #1) the write data transferred from the SLC buffer 201 to the internal buffer 161 and the write data for the QLC super block (QLC SB #1) newly transferred from the write buffer 51 of the host 2 (step S24).

Figure 13A:
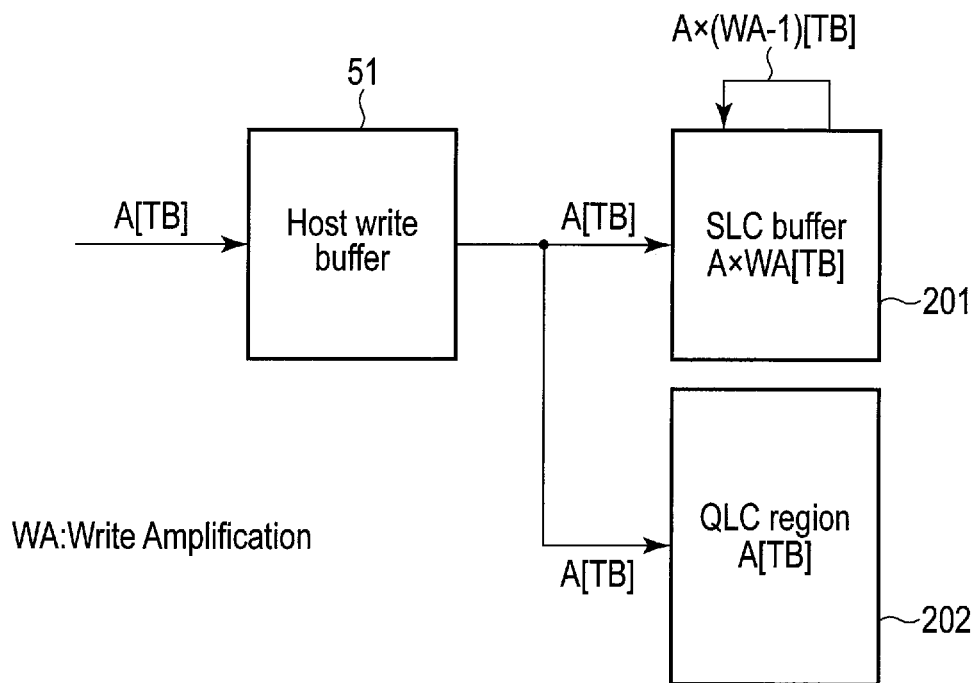
FIG. 13A is a diagram illustrating an SLC buffer capacity required in the SSD according to the comparative example.
Figure 13B:
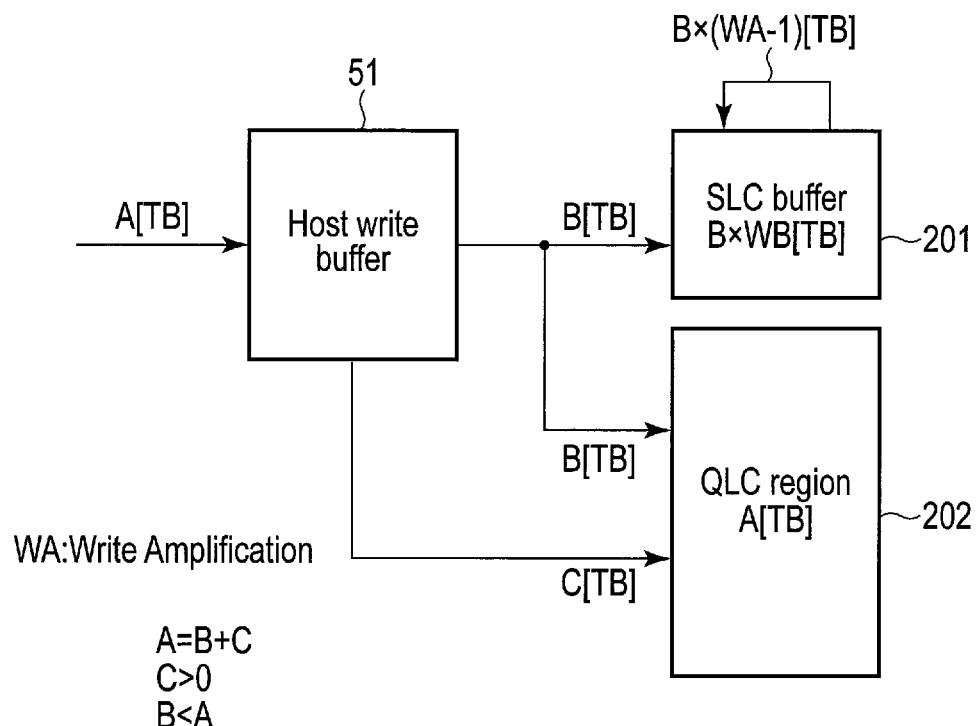
FIG. 13B is a diagram illustrating an SLC buffer capacity required in the memory system according to the embodiment.

FIG. 13A is a diagram illustrating an SLC buffer capacity required in the SSD according to the comparative example, and FIG. 13B is a diagram illustrating an SLC buffer capacity required in the memory system according to the embodiment.

As illustrated in FIG. 13A, all the data to be written to the QLC region 202 are also written to the SLC buffer 201, in the SSD according to the comparative example.

In the case where the host 2 sequentially executes the writing to each QLC super block of the QLC region 202, each QLC super block of the QLC region 202 does not include invalid data. Therefore, GC for the QLC region 202 is not executed.

In contrast, since the SLC buffer 201 is shared by the plurality of QLC super blocks, GC for the SLC buffer 201 is necessary.

For example, it is assumed that the total amount (TBW: TeraBytes Written) of the data written to the QLC region 202 by the host 2 is A [TB]. In this case, the total amount of the data written to the SLC buffer 201 is A×(WA) [TB]. WA is indicative of the write amplification of the SLC buffer 201. Since GC for the SLC buffer 201 is necessary, the write amplification WA of the SLC buffer 201 is a value larger than 1.

As illustrated in FIG. 13B, writing the data to the SLC buffer 201 is executed only when the inactivate request is received from the host 2, in the SSD according to the present embodiment.

For example, it is assumed that the total amount of the data written to the QLC region 202 by the host 2 is A [TB], the total amount of the data directly written to the QLC region 202, of A [TB], is C [TB], and the total amount of the data written to the SLC buffer 201 by all the inactivate requests is B [TB].

A [TB], B [TB], and C [TB] have the following relationships.

$$A=B+C$$

$$C>0$$

$$B<A$$

The total amount of the data to be written to the QLC region 202 is A (=B+C) [TB].

In contrast, the total amount of the data necessary to be written to the QLC region 202 is B×(WA) [TB]. Since B is smaller than A, the total amount of the data necessary to the written to the SLC buffer 201 can be reduced in the present embodiment.

The capacity larger than or equal to W1 and larger than or equal to W2 is allocated to the SLC buffer 201.

$W1$="maximum inactive count"×"$WA$ of SLC buffer"×"minimum write size"/"maximum number of erase operations permissible for the SLC buffer"

The maximum inactive count is indicative of the maximum number of times of being capable of executing the operation of causing a QLC super block to transition to the inactive state in the life of the SSD 3.

$W2$="maximum number of QLC super blocks in the inactive state that can exist simultaneously"× (1+overprovisioning)×"minimum write size"

W1 is indicative of the SLC buffer capacity to satisfy the total write amount (TBW) required to the SLC buffer 201. In addition, W2 is indicative of the SLC buffer capacity necessary in the worst case where the number of the QLC super blocks in the inactive state existing simultaneously becomes "maximum number of QLC super blocks in the inactive state that can exist simultaneously".

When W1>W2, the SLC buffer capacity can be reduced and the write performance can be improved.

In addition, the maximum capacity available as the QLC region 202 can be determined in the following manner, based on the SLC buffer capacity.

("total capacity of the NAND flash memory 5"−"SLC buffer capacity")×"number of bits per memory cell"

In the embodiment, the number of bits per memory cell is, for example, 4 bits.

FIG. 14 illustrates an example of a data structure of the block management table 33.

The block management table 33 includes a plurality of regions that correspond to all the QLC super blocks (in this example, QLC SB #1 to QLC SB #n) in the NAND flash memory 5. The QLC SB #1 to QLC SB #n include at least the QLC super blocks in the open state, the QLC super blocks in the inactive state, the QLC super blocks in the closed state in which the whole block is filled with data, and the like.

Each of the regions in the block management table 33 stores metadata related to the QLC super block corresponding to this region.

For example, the metadata of the region corresponding to QLC SB #1 includes (1) an un-readable pointer (URP) indicative of an un-readable minimum physical address in QLC SB #1, (2) a write pointer WP indicative of a next write destination physical address in QLC SB #1, and (3) an address list including one or more addresses each indicative of a location where data un-readable from QLC SB #1 is stored.

The data un-readable from QLC SB #1 means the data wherein the operation of writing the data to QLC SB #1 is started, but the data write operation is not finished and cannot be normally read from QLC SB #1. For example, the data for which the only foggy write operation is finished and the fine write operation is not finished is the data un-readable from QLC SB #1.

Similarly, the metadata of the region corresponding to QLC SB #2 also includes (1) an un-readable pointer (URP) indicative of an un-readable minimum physical address in QLC SB #2, (2) a write pointer WP indicative of a next write destination physical address in QLC SB #2, and (3) an address list including one or more addresses each indicative of a location where data un-readable from QLC SB #2 is stored.

Similarly, the metadata of the region corresponding to QLC SB #n also includes (1) an un-readable pointer (URP) indicative of an un-readable minimum physical address in QLC SB #n, (2) a write pointer WP indicative of a next write destination physical address in QLC SB #n, and (3) an address list including one or more addresses each indicative of a location where data un-readable from QLC SB #n is stored.

FIG. 15 is a diagram illustrating the un-readable pointer (URP) and the write pointer (WP) corresponding to the QLC super block in the open state or inactive state.

In each QLC super block in the open state or the inactive state, the write pointer (WP) is indicative of the physical storage location in this QLC super block where data is to be next written. In each QLC super block in the open state or the inactive state, the un-readable pointer (URP) is indicative of the un-readable minimum physical address in this QLC super block as described above. FIG. 15 illustrates a case where the physical storage location where data is to be next written is page j+1 and the un-readable minimum physical address is page i+1. A page range corresponding to page 0 to page i is a readable area where the data can be normally read from the QLC super block, and a page range corresponding to page i+1 to last page k is an un-readable area where the data cannot be normally read from the QLC super block.

A page range corresponding to page i+1 to page j, of the un-readable area, is an area where data is being written, i.e., an area where the write operation is started but is not finished, and a page range corresponding to page j+1 to page k is an unwritten area where writing data is not started.

New data is written to the page specified by WP. When the data is written to the page specified by WP, the fine write operation to the region where data is being written is executed. Thus, URP is updated and WP is also updated.

FIG. 16 is a diagram illustrating the un-readable pointer (URP) and the write pointer (WP) corresponding to the QLC super block in the closed state.

URP and WP of any of QLC super blocks in the closed state are indicative of values larger than the physical address (i.e., last page address in the block) of the end of the block.

Therefore, the controller 4 can rapidly determine whether or not the read target data is readable from the read target QLC super block, i.e., whether a read target physical storage location belongs to the readable region of the read target QLC super block or the un-readable region of the read target QLC super block, by merely comparing the physical address indicative of the read target physical storage location associated with the logical address of the read target data specified by the read command received from the host 2, with URP of the read target QLC super block.

Figure 17:
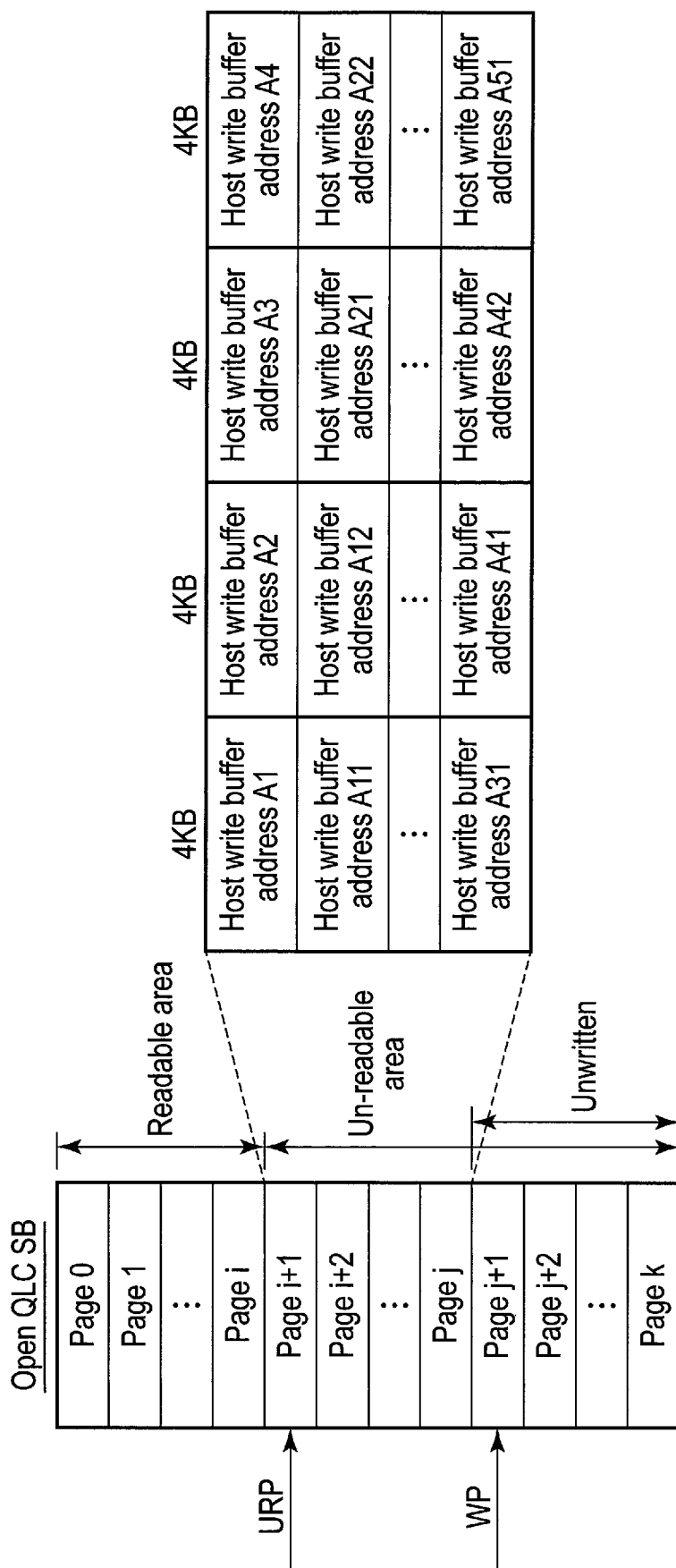
FIG. 17 is a diagram illustrating an address list including addresses each indicative of a location where data to be written to an un-readable region of a QLC super block (write destination storage region) in the open state exists.

FIG. 17 is a diagram illustrating an address list including addresses each indicative of a location where data to be written to the un-readable region (region where writing of data is in progress) of the QLC super block (write destination storage region) in the open state exists.

In each QLC super block in the open state, for each data to be written to the region where data is being written, the buffer address indicative of the location in the write buffer 51 of the host 2 where this data exists is managed. For example, as regards four 4 KB data to be written to the page i+1, addresses A1, A2, A3, and A4 indicative of the locations in the write buffer 51 of the host 2 where the four 4 KB data are stored respectively are managed. Since each write request includes the data pointer, the address indicative of the location in the write buffer 51 of the host 2 can easily be managed.

As regards the write data already transferred from the write buffer 51 of the host 2 to the internal buffer 161, the address indicative of the location in the internal buffer 161 where this write data is stored may be managed.

FIG. 18 is a diagram illustrating an address list including addresses each indicative of a location where data to be written to the un-readable region (i.e., the region where data is being written) of the QLC super block in the inactive state exists.

In each QLC super block in the inactive state, for each data to be written to the region where data is being written, the buffer address indicative of the location in the SLC buffer 201 where this data exists is managed. For example, as regards four 4 KB data to be written to the page i+1, physical addresses PBA1, PBA2, PBA3, and PBA4 indicative of the locations in the SLC buffer 201 where the four 4 KB data are stored respectively are managed.

FIG. 19 is a flowchart illustrating a procedure of the read operation executed in the SSD 3.

When receiving the read command (read request) from the host 2 (step S31), the controller 4 determines the QLC super block to which the logical address of the read target data, which is specified by the received read request, is assigned, as a read target QLC super block (step S32). In step S32, the controller 4 may determine the physical address (block address) of the read target QLC super block by referring to the L2P table 31.

In a case where different LBA ranges are assigned to a plurality of QLC super blocks, respectively, the controller 4 may determine the read target QLC super block, based on information indicative of correspondence between each LBA range and each QLC super block since the correspondence between each LBA range and each QLC super block is predetermined.

The controller 4 determines which of the QLC super blocks, the SLC buffer 201, and the internal buffer 161 the read target data is stored in. When the location in the read target QLC super block where the read target data is to be stored is the readable region (YES in step S33), the controller 4 can determine that the read target data is stored in the read target QLC super block. In this case, the controller 4 reads the read target data from the read target QLC super block and transmits the read data to the host 2 (step S34).

When the location in the read target QLC super block where the read target data is to be stored is not the readable region (NO in step S33), the controller 4 determines which of the SLC buffer 201 and the write buffer 51 of the host 2 the read target data is stored in, based on the address list corresponding to the region where the data is being written, of the read target QLC super block (step S35).

When the read target data is stored in the SLC buffer 201 ("SLC buffer" in step S35), the controller 4 reads the read target data from the storage location in the SLC buffer 201 and transmits the read target data which is read to the host 2 (step S36).

When the read target data is not stored in the SLC buffer 201 but stored in the write buffer 51 of the host 2 ("host write buffer" in step S35), the controller 4 notifies the host 2 of information indicating that the read target data does not exist in the SSD 3 (step S37). In accordance with receiving the notice, the host 2 can recognize that the read target data is stored in the write buffer 51 of the host 2 and can thereby read the read target data from the write buffer 51 of the host 2.

The example of determining which of the SLC buffer 201 and the write buffer 51 of the host 2 the read target data is stored in is illustrated in step S35 but, when the read target data is not stored in the plurality of QLC super blocks, the SLC buffer 201, or the internal buffer 161 but stored in the write buffer 51 of the host 2, the controller 4 may notify the host 2 of the information indicating that the read target data does not exist in the SSD 3.

FIG. 20 is a flowchart illustrating another procedure of the read operation executed in the SSD 3.

In FIG. 20, a process in step S40 is executed instead of the process in step S37 of FIG. 19.

When the read target data is not stored in a plurality of QLC blocks, the SLC buffer 201 or the internal buffer 161 but stored in the write buffer 51 of the host 2, the controller 4 notifies the host 2 of information indicative of the location in the write buffer 51 of the host 2 where the read target data is stored (step S40). The host 2 can easily read the read target data from the write buffer 51 of the host 2, based on the notified location.

According to the present embodiment, as described above, the controller 4 writes the write data received from the host 2 to the only write destination QLC super block (first write destination storage region) and does not write the write data to the SLC buffer 201.

When receiving the inactivate request from the host 2, the controller 4 transfers the remaining write data (un-transferred write data) associated with one or more write requests of the received write requests for the write destination QLC super block, from the write buffer of the host 2 to the internal buffer 161, the remaining write data being data un-transferred to the internal buffer 161. Then, the controller 4 writes the remaining write data transferred to the internal buffer 161 to the only SLC buffer 201 but does not write the remaining write data to the write destination QLC super block.

Therefore, the process of persistently storing the remaining write data to be written to the write destination QLC super block which is caused to transition to the inactive state can be rapidly executed.

In addition, as described above, since the write data is not written to the SLC buffer 201 until the inactivate request is received from the host 2, the total amount of data necessary to be written to the SLC buffer 201 can be reduced.

As a result, the total number of blocks necessary to be used as the SLC blocks, of the blocks included in the NAND flash memory 5, can be reduced and the total number of the blocks that can be used as the QLC blocks can be thereby increased.

In addition, the write buffer 51 of the host 2 may be implemented by a nonvolatile write buffer. The nonvolatile write buffer may be implemented by a nonvolatile memory such as a storage class memory (SCM).

When the write buffer 51 of the host 2 is implemented by the nonvolatile write buffer, and even when the data in the internal buffer 161 are lost by power loss such as power failure, the data can be acquired again from the nonvolatile write buffer of the host 2. Therefore, even if the SSD 3 does not comprise a capacitor for executing a power loss protection function, it is possible to prevent the data in the internal buffer 161 from being lost due to power loss.

In addition, it has been described that the SLC buffer 201 is used as the storage region for storing the remaining write data to be written to the write destination QLC super block caused to transition to the inactive state, in the present embodiment, but a nonvolatile memory such as a storage class memory (SCM) may be used as a storage region for storing the remaining write data which are to be written to the write destination QLC block caused to transition to the inactive state.

In addition, basically, when each of the plurality of first storage regions has a storage density higher than that of the second storage region and when the write speed of the second storage region is higher than the write speed of each of the first storage regions, the same advantages as those of the present embodiment can be achieved. For this reason, an aspect of writing data to each of the plurality of first storage regions in a write mode of writing m-bit per memory cell, and writing data to the second storage region in a write mode of writing n-bit (n<m) per memory cell may be employed. In this example, n is an integer of 1 or more and m is an integer larger than n.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller electrically connected to the nonvolatile memory and configured to write data to each of a plurality of first storage regions included in the nonvolatile memory in a first write mode of writing a plurality of bits per memory cell and write data to a second storage region included in the nonvolatile memory in a second write mode of writing 1 bit per memory cell, wherein
the controller is configured to:
in response to receiving from the host write requests to write data to a first write destination storage region allocated from the plurality of first storage regions, transfer write data associated with a set of the received write requests from a write buffer of the host to an internal buffer in the memory system, and write the write data transferred to the internal buffer to the first write destination storage region in the first write mode without writing the write data to the second storage region; and
when receiving from the host a first request to cause a state of the first write destination storage region to transition from a first state of being allocated as a write destination storage region where writing of data is capable of being executed to a second state in which the writing is suspended, transfer remaining write data associated with one or more write requests of the received write requests for the first write destination storage region, from the write buffer of the host to the internal buffer, the remaining write data being data un-transferred to the internal buffer, write the remaining write data transferred to the internal buffer to the second storage region in the second write mode without writing the remaining write data to the first write destination storage region, and cause the state of the first write destination storage region to transition from the first state to the second state.

2. The memory system of claim 1, wherein
the controller is configured to transmit to the host one or more responses indicative of completion of the one or more first write requests and a response indicative of completion of the first request, after writing the remaining write data transferred to the internal buffer to the second storage region in the second write mode.

3. The memory system of claim 1, wherein
the controller is configured to:
receive a read request from the host;
when read target data specified by the received read request is stored in one first storage region of the plurality of first storage regions, read the read target data from the one first storage region and transmit the read target data which is read to the host;
when the read target data is not stored in any one of the plurality of first storage regions but stored in the second storage region or the internal buffer, read the read target data from the second storage region or the internal buffer, and transmit the read target data which is read to the host; and
when the read target data is not stored in the plurality of first storage region, the internal buffer or the second storage region but stored in the write buffer of the host, notify the host of information indicating that the read target data does not exist in the memory system.

4. The memory system of claim 1, wherein
the controller is configured to:
receive a read request from the host;
when read target data specified by the received read request is stored in one first storage region of the plurality of first storage regions, read the read target data from the one first storage region and transmit the read target data which is read to the host;
when the read target data is not stored in any one of the plurality of first storage regions but stored in the second storage region or the internal buffer, read the read target data from the second storage region or the internal buffer, and transmit the read target data which is read to the host; and when the read target data is not stored in the plurality of first storage region, the internal buffer or the second storage region but stored in the write buffer of the host, notify the host of information indicative of a location in the write buffer of the host where the read target data is stored.

5. The memory system of claim 1, wherein the controller is configured to:
in response to receiving from the host a write request for the first write destination storage region which is in the second state, after causing the state of the first write destination storage region to transition from the first state to the second state,
 cause the state of the first write destination storage region to transition from the second state to the first state; and
 read the remaining write data stored in the second storage region from the second storage region, and write the remaining write data which is read to the internal buffer.

6. The memory system of claim 1, wherein
when both the first write destination storage region and a second write destination storage region are allocated from the plurality of first storage regions,
the controller is configured to:
classify write requests received from the host into a first group of write requests to write data to the first write destination storage region and a second group of write requests to write data to the second write destination storage region;
when a total size of write data associated with a set of the write requests belonging to the first group reaches a minimum write size of the nonvolatile memory, transfer the write data associated with the set of the write requests belonging to the first group, having the minimum write size, from the write buffer of the host to the internal buffer; and
when a total size of write data associated with a set of the write requests belonging to the second group reaches the minimum write size, transfer the write data associated with the set of the write requests belonging to the second group, having the minimum write size, from the write buffer of the host to the internal buffer.

7. The memory system of claim 1, wherein
the write buffer of the host is a nonvolatile write buffer.

8. The memory system of claim 1, wherein
the nonvolatile memory includes a plurality of physical blocks,
a set of first physical blocks, of the plurality of physical blocks, is organized as the plurality of first storage regions, and a set of second physical blocks, of the plurality of physical blocks, is organized as the second storage region, and
the plurality of first storage regions are a plurality of block groups each including a plurality of physical blocks.

9. A method of controlling a memory system including a nonvolatile memory, the method comprising:
writing data to each of a plurality of first storage regions included in the nonvolatile memory in a first write mode of writing a plurality of bits per memory cell;
writing data to a second storage region included in the nonvolatile memory in a second write mode of writing 1 bit per memory cell;

in response to receiving from a host write requests to write data to a first write destination storage region allocated from the plurality of first storage regions, performing an operation of transferring write data associated with a set of the received write requests from a write buffer of the host to an internal buffer in the memory system, and an operation of writing the write data transferred to the internal buffer to the first write destination storage region in the first write mode without writing the write data to the second storage region; and when receiving from the host a first request to cause a state of the first write destination storage region to transition from a first state of being allocated as a write destination storage region where writing of data is capable of being executed to a second state in which the writing is suspended, performing (i) an operation of transferring remaining write data associated with one or more first write requests of the received write requests for the first write destination storage region, from the write buffer of the host to the internal buffer, the remaining write data being data un-transferred to the internal buffer, and (ii) an operation of writing the remaining write data transferred to the internal buffer to the second storage region in the second write mode without writing the remaining write data to the first write destination storage region, and (iii) an operation of causing the state of the first write destination storage region to transition from the first state to the second state.

10. The method of claim 9, further comprising:
transmitting to the host one or more responses indicative of completion of the one or more first write requests and a response indicative of completion of the first request, after writing the remaining write data transferred to the internal buffer to the second storage region in the second write mode.

11. The method of claim 9, further comprising:
receiving a read request from the host;
when read target data specified by the received read request is stored in one first storage region of the plurality of first storage regions, reading the read target data from the one first storage region, and transmitting the read target data which is read to the host;
when the read target data is not stored in any one of the plurality of first storage regions but stored in the second storage region or the internal buffer, reading the read target data from the second storage region or the internal buffer, and transmitting the read target data which is read to the host; and
when the read target data is not stored in the plurality of first storage region, the internal buffer or the second storage region but stored in the write buffer of the host, notifying the host of information indicating that the read target data does not exist in the memory system.

12. The method of claim 9, further comprising:
receiving a read request from the host;
when read target data specified by the received read request is stored in one first storage region of the plurality of first storage regions, reading the read target data from the one first storage region, and transmitting the read target data which is read to the host;
when the read target data is not stored in any one of the plurality of first storage regions but stored in the second storage region or the internal buffer, reading the read target data from the second storage region or the internal buffer, and transmitting the read target data which is read to the host; and when the read target data is not stored in the plurality of first storage region, the internal buffer or the second storage region but stored in the write buffer of the host, notifying the host of information indicative of a location in the write buffer of the host where the read target data is stored.

13. The method of claim 9, further comprising:
in response to receiving from the host a write request for the first write destination storage region which is in the second state, after causing the state of the first write destination storage region to transition from the first state to the second state,
  causing the state of the first write destination storage region to transition from the second state to the first state; and
  reading the remaining write data stored in the second storage region from the second storage region, and writing the remaining write data which is read to the internal buffer.

14. The method of claim 9, further comprising:
when the first write destination storage region and a second write destination storage region are allocated from the plurality of first storage regions,
  classifying write requests received from the host into a first group of write requests to write data to the first write destination storage region and a second group of write requests to write data to the second write destination storage region;
  when a total size of write data associated with a set of the write requests belonging to the first group reaches a minimum write size of the nonvolatile memory, transferring the write data associated with the set of the write requests belonging to the first group, having the minimum write size, from the write buffer of the host to the internal buffer; and
  when a total size of write data associated with a set of the write requests belonging to the second group reaches the minimum write size, transferring the write data associated with the set of the write requests belonging to the second group, having the minimum write size, from the write buffer of the host to the internal buffer.

15. The method of claim 9, wherein
the write buffer of the host is a nonvolatile write buffer.

* * * * *